(12) United States Patent
Colley, III et al.

(10) Patent No.: US 12,000,254 B1
(45) Date of Patent: Jun. 4, 2024

(54) SWING VALVE WITH REPLACEABLE SEAT AND TOOLS AND METHODS FOR ENGAGING SEAT

(71) Applicant: KHOLLE Magnolia 2015, LLC, Tomball, TX (US)

(72) Inventors: E. Lee Colley, III, Jersey Village, TX (US); Larry Mitchel Hill, Cypress, TX (US); William Brent Stroebel, Houston, TX (US); Scott Taylor Donaldson, Spring, TX (US); Mark C. Dille, Magnolia, TX (US)

(73) Assignee: KHOLLE Magnolia 2015, LLC

( * ) Notice: Subject to any disclaimer, the term of this patent is extended or adjusted under 35 U.S.C. 154(b) by 226 days.

(21) Appl. No.: 17/576,626

(22) Filed: Jan. 14, 2022

(51) Int. Cl.
*E21B 43/26* (2006.01)
*F04B 53/10* (2006.01)
*F16K 1/42* (2006.01)
*F16K 15/03* (2006.01)

(52) U.S. Cl.
CPC ...... *E21B 43/2607* (2020.05); *F04B 53/1037* (2013.01); *F16K 1/42* (2013.01); *F16K 15/03* (2013.01)

(58) Field of Classification Search
CPC ......... Y10T 137/6086; Y10T 137/6109; F16K 1/42; F16K 15/00–12; F04B 53/10; F04B 53/1037
See application file for complete search history.

(56) References Cited

U.S. PATENT DOCUMENTS

| | | | | |
|---|---|---|---|---|
| 5,056,548 A | * | 10/1991 | Mills | F16K 15/03 137/527.2 |
| 5,080,122 A | * | 1/1992 | Neuzeret | F16K 15/063 137/220 |
| 10,240,597 B2 | * | 3/2019 | Bayyouk | F04B 53/22 |
| 10,295,071 B2 | * | 5/2019 | Nguyen | F16K 27/0227 |
| 10,400,764 B2 | | 9/2019 | Wagner et al. | |

* cited by examiner

*Primary Examiner* — Kevin F Murphy
(74) *Attorney, Agent, or Firm* — Keith B. Willhelm

(57) ABSTRACT

Swing valves have a passage and a sleeve. The passage has a receptacle, and the sleeve is pressure fitted into the receptacle. The sleeve is adapted to conduct flow through the valve and comprises a first end, a second end, and a valve seat. The first end of the sleeve is pressure fitted into the receptacle. The second end projects out of the receptacle. The valve seat is on the face of the second sleeve end. The second sleeve end also is adapted to couple with a sleeve cap extending over and across the second sleeve end to shut off flow through the sleeve.

37 Claims, 19 Drawing Sheets

SWING VALVE WITH REPLACEABLE SEAT AND TOOLS AND METHODS FOR ENGAGING SEAT

FIELD OF THE INVENTION

The present invention relates generally to fluid transportation systems and flow lines and components used in those systems, and especially to systems for conveying abrasive, corrosive fluids under high pressures and flow rate as are common, for example, in the oil and gas industry. More particularly, it relates to swing valves having a replaceable, pressure-fitted valve seat sleeve and to tools and methods for servicing the sleeve.

BACKGROUND OF THE INVENTION

Hydrocarbons, such as oil and gas, may be recovered from various types of subsurface geological formations. The formations typically consist of a porous layer, such as limestone and sands, overlaid by a nonporous layer. Hydrocarbons cannot rise through the nonporous layer. Thus, the porous layer forms a reservoir, that is, a volume in which hydrocarbons accumulate. A well is drilled through the earth until the hydrocarbon bearing formation is reached. Hydrocarbons then can flow from the porous formation into the well. In what is perhaps the most basic form of rotary drilling methods, a drill bit is attached to a series of pipe sections or "joints" referred to as a drill string. The drill string is suspended from a derrick and rotated by a motor in the derrick. A drilling fluid or "mud" is pumped down the drill string, through the bit, and into the bore of the well. This fluid serves to lubricate the bit. The drilling mud also carries cuttings from the drilling process back to the surface as it travels up the wellbore. As the drilling progresses downward, the drill string is extended by adding more joints of pipe.

When the drill bit has reached the desired depth, larger diameter pipes, or casing, are placed in the well and cemented in place to prevent the sides of the borehole from caving in. The well may be extended by drilling additional sections and installing large, but somewhat smaller pipes, or liners. The liners also are typically cemented in the bore. The liner may include valves, or it may then be perforated. In either event, openings in the liner are created through which oil can enter the cased well. Production tubing, valves, and other equipment are installed in the well so that the hydrocarbons may flow in a controlled manner from the formation, into the lined well bore, and through the production tubing up to the surface for storage or transport.

Hydrocarbons, however, are not always able to flow easily from a formation to a well. Some subsurface formations, such as sandstone, are very porous. Hydrocarbons can flow easily from the formation into a well. Other formations, however, such as shale rock, limestone, and coal beds, are only minimally porous. The formation may contain large quantities of hydrocarbons, but production through a conventional well may not be commercially practical because hydrocarbons flow though the formation and collect in the well at very low rates. The industry, therefore, relies on various techniques for improving the well and stimulating production from formations. In particular, various techniques are available for increasing production from formations which are relatively nonporous.

Perhaps the most important stimulation technique is the combination of horizontal wellbores and hydraulic fracturing. A well will be drilled vertically until it approaches a formation. It then will be diverted, and drilled in a more or less horizontal direction, so that the borehole extends along the formation instead of passing through it. More of the formation is exposed to the borehole, and the average distance hydrocarbons must flow to reach the well is decreased. Fractures then are created in the formation which will allow hydrocarbons to flow more easily from the formation.

Fracturing a formation is accomplished by pumping fluid, most commonly water, into the well at high pressure and flow rates. Proppants, such as grains of sand, ceramic or other particulates, usually are added to the fluid along with gelling agents to create a slurry. The slurry is forced into the formation at rates faster than can be accepted by the existing pores, fractures, faults, vugs, caverns, or other spaces within the formation. Pressure builds rapidly to the point where the formation fails and begins to fracture. Continued pumping of fluid into the formation will tend to cause the initial fractures to widen and extend further away from the wellbore, creating flow paths to the well. The proppant serves to prevent fractures from closing when pumping is stopped.

A formation rarely will be fractured all at once. It typically will be fractured in many distinct locations or zones and in many distinct stages. Fluids will be pumped into the well to fracture the formation in a first zone. Typically, the first zone will be at the bottom or "toe" of the well. After the initial zone is fractured, pumping is stopped, and a plug is installed or otherwise established in the liner at a point above the fractured zone. Pumping is resumed, and fluids are pumped into the well to fracture the formation in a second zone located above the plug. That process is repeated for zones further up the formation until the formation has been completely fractured.

Once the well is fractured, large quantities of water and sand that were injected into the formation eventually must be allowed to flow out of the well. The water and sand will be separated from hydrocarbons produced by the well to protect downstream equipment from damage and corrosion. The production stream also may require additional processing to neutralize corrosive agents in the stream.

Systems for successfully completing a fracturing operation, therefore, are extensive and complex, as may be appreciated from FIG. 1. FIG. 1 illustrates schematically a conventional frac system. Water from tanks 1 and gelling agents dispensed by a chemical unit 2 are mixed in a hydration unit 3. The discharge from hydration unit 3, along with sand carried on conveyors 4 from sand tanks 5 is fed into a blending unit 6. Blender 6 mixes the gelled water and sand into a slurry. The slurry is discharged through low-pressure hoses 7 which convey it into two or more low-pressure lines 8 in a frac manifold 9. The low-pressure lines 8 in frac manifold 9 feed the slurry to an array of pumps 10, perhaps as many as a dozen or more, through low-pressure "suction" hoses 11.

Pumps 10 take the slurry and discharge it at high pressure through individual high-pressure "discharge" lines 12 into a "missile" 13 on frac manifold 9. The combined flow from pump discharge lines 12 flows through missile 13 into a high-pressure line 14 running to a junction head 15 of a "zipper" manifold 16 (sometimes also referred to as a "frac manifold"). Zipper manifold 16 includes flow lines 17 running to, for example, two well heads 19 that control flow into and out of their respective wells. Valves 18 are provided in zipper flow lines 17 so that the frac slurry may be selectively diverted to one of the well heads 19. Once fracturing is complete, flow back from the fracturing operation discharges into a flowback manifold 20 which leads into flowback tanks 21. Valves 18 then will be operated to divert frac fluid into the other well head 19 to frac that well.

Frac systems are viewed as having "low-pressure" and "high-pressure" sides or, more simply, as having low sides and high sides. The low side includes the components upstream of the inlet of pumps 10, e.g., water tanks 1, hydration unit 3, blending unit 6, and the low-pressure lines 8 of frac manifold 9, which operate under relatively low pressures. The conduits on the low-pressure side typically will be flexible hoses, such as blender hoses 7 and suction hoses 11.

The high side includes all the components downstream of the discharge outlets of pumps 10, e.g., the high-pressure missiles 13 of frac manifold 9 and flow lines 14 running to junction head 15, which operate under relatively high pressures. The conduits in the high-pressure side of frac systems typically are assembled on site, although some subsystems are pre-assembled on a skid, trailer, or truck, such as frac manifold 9 and zipper manifold 16.

The components used to assemble the high side of frac systems are referred to generally as "frac iron," "flow iron," or "ground iron." They include sections of straight steel pipe, such as pup joints. They also include various fittings, such as tees, crosses, laterals, and wyes, which provide junctions at which flow is split or combined. In addition to junction fittings, flowline components include fittings which are used to alter the course of a flow line. Such directional fittings include elbows and swivel joints. High-pressure flow lines also incorporate gauges and other monitoring equipment, as well as control devices such as shut-off, plug, check, throttle, pressure release, butterfly, and choke valves.

Fluid is designed to flow through most of a frac system in only one direction: towards the well. Once pumping is stopped, however, large quantities of slurry will flow out of the well at rates and pressures at least initially comparable to those used to fracture the well. Gate valves or other types of shut off valves will be installed in the system to divert the return flow into recovery tanks and to protect upstream portions of the system. In particular, pumps must be protected against back flow. Actuating shut off valves, however, may take some time. Operators also may neglect to open or shut the appropriate valves. Thus, frac systems commonly incorporate various automatic check valves to ensure that fluid is able to travel in only one direction through a particular part of the system.

Check valves in frac systems commonly are "flapper" style check valves. Flapper valves, as their name suggests, incorporate a swinging closure often referred to as a flapper. The flapper normally hangs down, under the influence of gravity, across the face of a seat provided in the inlet end of the valve conduit. Fluid flowing through the conduit in the desired or "flow" direction of the valve will push against the flapper, causing it to swing up and allow fluids to pass through the valve. Flow in the opposite, reverse-flow direction, however, will cause the flapper to bear and seal against the seat, shutting off back flow through the valve.

Flapper valves are better suited than other check valves, such as dart check valves, for systems conveying particulate laden, abrasive fluids such as frac fluids. Particulate matter is less likely to interfere with the operation of flapper valves. Nevertheless, and though they are fabricated from steel and quite rugged, flapper valves can suffer shortened service life or failure due to the harsh conditions to which they are exposed. Frac fluids are pumped through the system at extremely high pressures and flow rates. Not only is the slurry abrasive, but it often is corrosive as well.

Frac jobs also have become more extensive, both in terms of the pressures required to fracture a formation and the time required to complete all stages of an operation. Prior to horizontal drilling, a typical vertical well might require fracturing in only one, two or three zones at pressures usually well below 10,000 psi. Fracturing a horizontal well, however, may require fracturing in 20 or more zones. Horizontal wells in shale formations such as the Eagle Ford shale in South Texas typically require fracturing pressures of at least 9,000 psi and 6 to 8 hours or more of pumping. Horizontal wells in the Haynesville shale in northeast Texas and northwest Louisiana require pressures around 13,500 psi. Pumping may continue near continuously—at flow rates of 2 to 3 thousand gallons per minute (gpm)—for several days before fracturing is complete.

Thus, flapper valves in frac systems may suffer relatively rapid erosion. The flapper and seat can become eroded to the point that the valve can no longer check reverse flow. Any failure of flapper valves on site may interrupt fracturing, potentially reducing its effectiveness. Any servicing of the valves necessarily increases the time and cost required to complete the operation. Thus, many conventional flapper valves have designs that allow the flapper and the seat to be replaced periodically. Such valves include what may be referred to as inlet entry and top entry designs.

Inlet entry designs, such as Weco® flapper check valves available from FMC Technologies, Inc, Houston, Texas, have a replaceable assembly that includes both the seat and the flapper. The seat-flapper assembly is carried within the valve conduit. The assembly may be accessed for replacement by disassembling a two-part valve body. Once the inlet end of the valve body is removed, the seat-flapper assembly may be pulled out of the outlet end, and a new assembly inserted. Necessarily, however, the valve must be disassembled from the flow line in order to replace either the flapper or the seat.

Top entry designs have separate flappers and seats which may be accessed through a service port. Examples of such top entry flapper valves include those available from Tech-Seal International (TSI Flow Products), Houston, Texas, Weco top entry valves available from FMC Technologies, and SPM® 1502 clapper valves available from S.P.M. Flow Control, Inc., Fort Worth, Texas. In top entry valves, the valve body is a single integral piece which is provided with a service port extending from the top of the valve into the valve conduit. The service port is covered by a bonnet which can be removed to access the flapper and seat. The seat, for example, may be carried in the inlet end of the valve conduit. The flapper may be mounted on a bracket which rests on a shoulder in the service port and is held there by the access bonnet.

A primary advantage of top entry valves is that the flapper and seat, at least in theory, may be replaced without removing the valve from a flow line. Disassembling the valve from the flow line typically requires additional, time-consuming steps beyond replacing the seat and flapper. It also requires the use of powered lifting equipment, as the valves typically are too heavy to be lifted and positioned by hand. To the extent that the flapper and seat may be serviced without disassembling the valve from the flow line, time, effort, and costs are saved.

A disadvantage of top entry valves lies in the installation of the seat. The seat must be installed securely so that it is not displaced as fluid flows through the valve. Thus, the seat commonly will be threaded into the valve inlet, or it may be pressure fitted into a receptacle in the valve inlet. Either way, a worn seat may be difficult to remove and install when the time comes to replace it with a new seat. Special tools may be required. Even with top entry designs, the valve still may have to be disassembled from the flow line so that seat removal or installation tools may be deployed.

The statements in this section are intended to provide background information related to the invention disclosed and claimed herein. Such information may or may not constitute prior art. It will be appreciated from the foregoing, however, that there remains a need for new and improved components for frac systems and other high-pressure fluid transportation systems, especially for new and improved swing valves and valve systems. Likewise, there is a need for new and improved methods of servicing those valves. Such disadvantages and others inherent in the prior art are addressed by various aspects and embodiments of the subject invention.

SUMMARY OF THE INVENTION

The subject invention, in its various aspects and embodiments, relates generally to fluid transportation systems, and especially to systems for fracturing oil and gas wells and other systems that transport abrasive or corrosive fluids at high flow rates and pressures. More particularly, it is directed to swing valves having a replaceable, pressure-fitted valve seat sleeve and other improved swing valves that are used to control flow through those systems. It also is directed to tools and methods for servicing the valve seat sleeves. The invention encompasses various embodiments and aspects, some of which are specifically described and illustrated herein.

One broad embodiment and aspect of the subject invention provides for a swing valve. The swing valve comprise a passage and a sleeve. The passage has a receptacle, and the sleeve is pressure fitted into the receptacle. The sleeve is adapted to conduct flow through the valve and comprises a first end, a second end, and a valve seat. The first end of the sleeve is pressure fitted into the receptacle. The second end projects out of the receptacle. The valve seat is on the face of the second sleeve end. The second sleeve end also is adapted to couple with a sleeve cap extending over and across the second sleeve end to shut off flow through the sleeve.

Other embodiments provide such swing valves where the second end of the sleeve comprises external threads adapted to engage internal threads on the sleeve cap or where the second end of the sleeve comprises external lugs adapted to engage internal lugs on the sleeve cap.

Yet other embodiments provide such swing valves where the swing valve is a flapper valve or a pivot valve.

Additional embodiments provide such swing valves where a valve housing comprises a service port and a bonnet removably covering the service port. The service port provides access to a closure chamber.

Still other embodiments provide such swing valves where the valve housing has a union face an inlet adapted for connection to a flowline component by a flange union and a union face at an outlet adapted for connection to a flowline component by a flange union.

Further embodiments provide high-pressure fluid transportation systems comprising the novel swing valves.

Still other embodiments provide methods of assembling a system for fracturing a well. The methods comprise providing a flow line to convey frac fluid discharged from one or more high-pressure pumps to a well head and assembling the novel swing valves into the flow line.

In other embodiments and aspects, the subject invention provides systems for fracturing a well. The systems comprise a flow line and a swing valve. The flow line is adapted to convey frac fluid discharged from one or more high-pressure pumps to a well head. The swing valve is mounted in the flow line and adapted to control flow through the flow line. The swing valve comprises a valve housing, a passage, a swing closure, and a sleeve. The valve housing is adapted for assembly into the flow line. The passage is provided in the housing and has a valve inlet, a valve outlet, and a closure chamber. The swing closure is mounted for pivoting movement through the closure chamber. The sleeve is pressure fitted into a receptacle in the passage. The sleeve comprises a first end, a second end, and a valve seat. The first end of the sleeve is pressure fitted into the receptacle. The second end projects out of the receptacle into the closure chamber. The valve seat is on the face of the second sleeve end. The second sleeve end is adapted to couple with a sleeve cap extending over and across the second sleeve end to shut off flow through the sleeve.

Other embodiments provide such frac systems where the second end of the sleeve comprises external threads adapted to engage internal threads on the sleeve cap or comprises external lugs adapted to engage internal lugs on the sleeve cap.

Still other embodiments provide such frac systems where the valve housing comprises a service port and a bonnet removably covering the service port. The service port provides access to the closure chamber.

Further other embodiments provide such frac systems where the valve housing has a union face at the inlet adapted for connection to a flowline component by a flange union and a union face at the outlet adapted for connection to a flowline component by a flange union.

Yet other embodiments provide such frac systems where the swing valve is a flapper valve, a pivot valve, a pivot valve that may be set in an open mode or a shutoff mode, or a pivot valve that may be set in an open mode or a check mode.

In other important embodiments and aspects, the subject invention provides an assembly for removing a valve seat sleeve from a swing valve. The swing valve is assembled into a flow line adapted to convey frac fluid discharged from one or more high-pressure pumps to a well head. A first end of the valve seat sleeve is pressure fitted in a passage of the swing valve. The assembly comprises a cap coupled over a second end of the valve seat sleeve. The valve seat sleeve may be dislodged from the passage by generating hydraulic pressure in the valve seat sleeve behind the cap.

Other embodiments provide such assemblies where the second end of the sleeve comprises external threads adapted to receive internal threads on the cap or external lugs adapted to engage internal lugs on the cap.

Yet other embodiments provide such assemblies where the assembly comprises a face seal between the cap and a seat on the valve seat sleeve.

Still other embodiments provide such assemblies where the swing valve is a flapper valve or a pivot valve.

In other important embodiments and aspects, the subject invention provides a system for fracturing a well. The system comprises a flow line, a swing valve, a cap, a rod, and a linear actuator. The flow line is adapted to convey frac fluid discharged from one or more high-pressure pumps to a well head. The swing valve is assembled into the flow line and comprises a passage and a sleeve. The passage has a receptacle. The sleeve is pressure fitted into the receptacle and has a valve seat on a face of the sleeve. The cap is coupled to the sleeve over the valve seat. The rod has a first end coupled to the cap and extends through an access port in the flow line into the swing valve. The linear actuator is coupled to a second end of the rod. The sleeve may be dislodged from the receptacle by actuating the linear actuator.

Other embodiments provide such systems where a central axis of the swing valve passage is aligned with a central axis of the access port.

Still other embodiments provide such systems where the flow line comprises a fitting. The fitting comprises a main bore and a side bore. The main bore extends though the fitting. A central axis of the main bore is substantially aligned with a central axis of the swing valve passage. The side bore extends into the main bore and is adapted to divert flow out into or out of the main bore. One end the main bore provides the access port.

Further embodiments provide such systems where the fitting is assembled into the flow line between the swing valve and the well head or where the fitting is assembled into the flow line between the one or more high-pressure pumps and the swing valve.

Yet other embodiments provide such systems where the fitting is a tee, lateral, or cross fitting.

Other embodiments provide such systems where the linear actuator is a hydraulic cylinder or a rotatable threaded driver.

Still other embodiments provide such systems where the sleeve comprises external threads coupled to internal threads on the cap or external lugs coupled to internal lugs on the sleeve cap.

Additional embodiments provide such systems where the swing valve is a flapper valve or a pivot valve.

In other important embodiments and aspects, the subject invention provides methods for removing a valve seat sleeve pressure fitted into a receptacle in a swing valve. The method comprises coupling a cap on the valve seat sleeve and providing hydraulic pressure in the valve seat sleeve sufficient to dislodge the valve seat sleeve from the receptacle.

Other embodiments provide such methods where the cap is coupled to the valve seat sleeve by engaging internal threads on the sleeve cap with external threads on the valve seat sleeve or by engaging internal lugs on the sleeve cap with external lugs on the valve seat sleeve.

In other important embodiments and aspects, the subject invention provides methods of removing a valve seat sleeve from a swing valve mounted in a flow line. The flow line is adapted to convey frac fluid discharged from one or more high-pressure pumps to a well head. One end of the valve seat sleeve is pressure fitted in the swing valve. The method comprises extracting a swing closure assembly of the swing valve, coupling a cap over a second end of the valve seat sleeve, pumping fluid from at least one of the one or more high-pressure pumps through the flow line toward the swing valve, and building hydraulic pressure within the flow line to a level sufficient to dislodge the valve seat sleeve from the swing valve.

Other embodiments provide such methods where the swing closure assembly is extracted by removing a bonnet from a service port in the swing valve and extracting one or more components of the swing closure assembly through the service port.

Still other embodiments provide such methods where the swing closure assembly is extracted by removing a bonnet from a service port in the swing valve, removing a bonnet from an axle port in the swing valve, and extracting the swing closure assembly through the service port and the axel port.

Further embodiments provide such methods where the cap is coupled to the valve seat sleeve by engaging internal threads on the cap with external threads on the second end of the valve seat sleeve or by engaging internal lugs on the cap with external lugs on the second end of the valve seat sleeve.

Yet other embodiments provide such methods where the swing valve is a flapper valve or a pivot valve.

In other important embodiments and aspects, the subject invention provides methods for installing a valve seat sleeve into a receptacle in a swing valve. The method comprises inserting the valve seat sleeve into the receptacle, coupling a cap on the valve seat sleeve, and providing hydraulic pressure in the valve sufficient to pressure fit the valve seat sleeve in the receptacle.

Other embodiments provide such methods where the cap is coupled to the valve seat sleeve by engaging internal threads on the sleeve cap with external threads on the valve seat sleeve or by engaging internal lugs on the sleeve cap with external lugs on the valve seat sleeve.

In other important embodiments and aspects, the subject invention provides systems for fracturing a well. The system comprises a flow line and a swing valve. The flow line is adapted to convey frac fluid discharged from one or more high-pressure pumps to a well head. The swing valve is mounted in the flow line and adapted to control flow through the flow line. The swing valve comprises a valve housing, a passage, a valve seat, a pivoting closure arm, and a closure. The valve housing is adapted for assembly into the flow line. The passage is provided in the housing and has a valve inlet and a valve outlet. The valve seat is in the passage. The closure is connected to the closure arm and is adapted to seat on the valve seat. The closure is adapted to pivot away to allow flow through the passage and is adapted to bear on the seat to shutoff flow through the passage. The closure is connected to the flapper arm by a dovetail joint.

Other embodiments provide such systems where the swing valve is a pivot valve.

In other important embodiments and aspects, the subject invention provides systems for fracturing a well. The systems comprise a flow line and a flapper valve. The flow line is adapted to convey frac fluid discharged from one or more high-pressure pumps to a well head. The flapper valve is mounted in the flow line and adapted to control flow through the flow line. The flapper valve comprises a valve housing, a passage, a valve seat, a pivoting flapper arm, and a flapper. The valve housing is adapted for assembly into the flow line. The passage is in the housing and has a valve inlet and a valve outlet. The valve seat is in the passage. The flapper is connected to the flapper arm and adapted to seat on the valve seat. The flapper is adapted to pivot away from the seat in response to flow through the passage in a flapper valve flow direction to allow flow through the passage in the flapper valve flow direction. The flapper also is adapted to bear on the seat in response to flow through the passage in a flapper valve reverse-flow direction to check flow through the passage in the flapper valve reverse-flow direction. The flapper is connected to the flapper arm by a dovetail joint.

Other embodiments provide such systems where the flapper valve comprises a hydrofoil. The hydrofoil extends from the flapper and is connected to the flapper by a dovetail joint.

Finally, still other aspects and embodiments of the invention provide apparatus and methods having various combinations of such features as will be apparent to workers in the art.

Thus, the present invention in its various aspects and embodiments comprises a combination of features and characteristics that are directed to overcoming various shortcomings of the prior art. The various features and characteristics described above, as well as other features and characteristics, will be readily apparent to those skilled in the art upon reading the following detailed description of the preferred embodiments and by reference to the appended drawings.

Since the description and drawings that follow are directed to particular embodiments, however, they shall not be understood as limiting the scope of the invention. They are included to provide a better understanding of the invention and the ways in which it may be practiced. The subject invention encompasses other embodiments consistent with the claims set forth herein.

Figure 1:
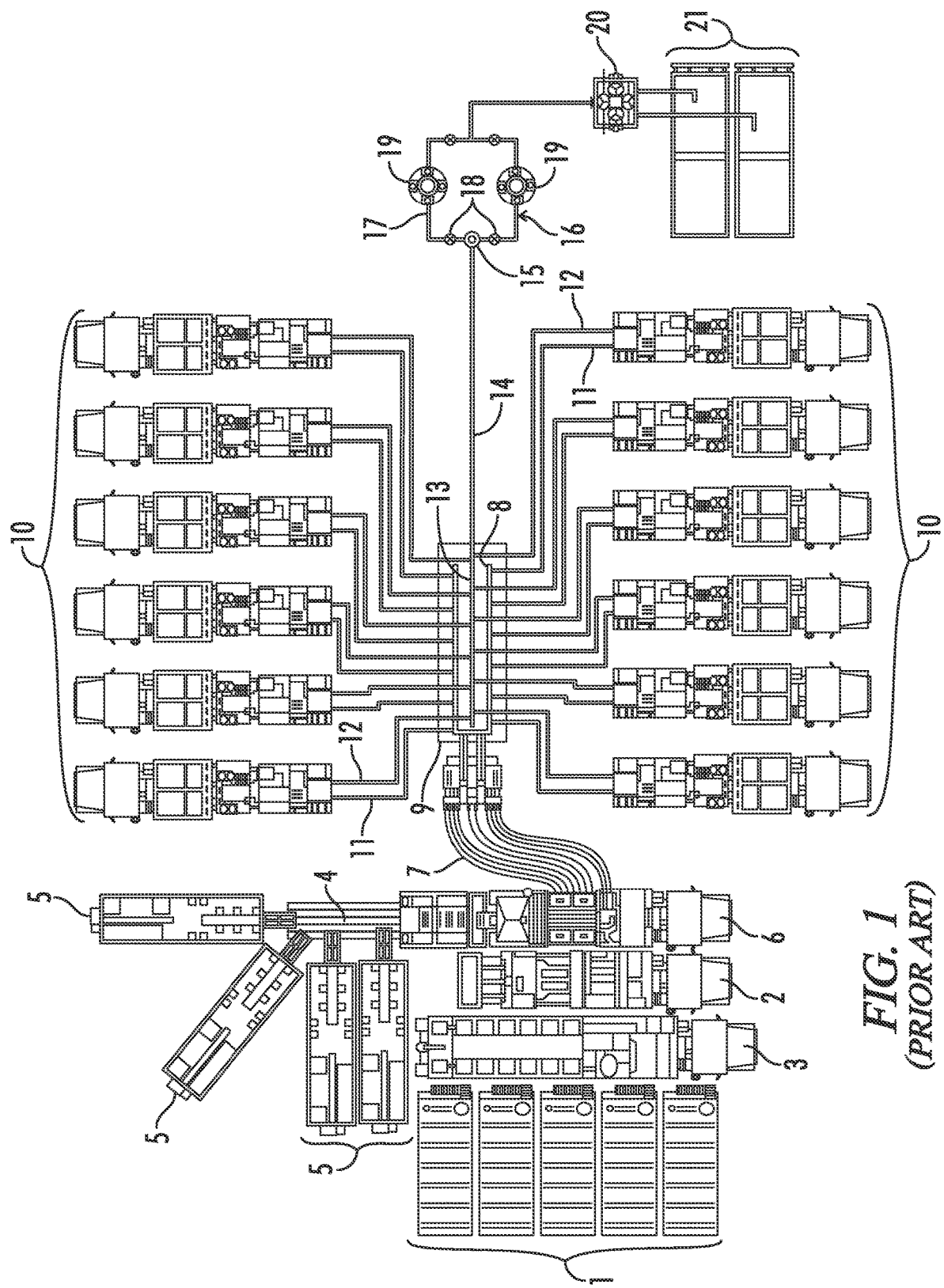
FIG. 1 (prior art) is a schematic view of a system for fracturing a well and receiving flowback from the well, which system includes a conventional zipper manifold 16 incorporating conventional valves 18.

In the drawings and description that follows, like parts are identified by the same reference numerals. It also will be apparent from the discussion that follows that certain conventions have been adopted to facilitate the description of the novel systems which typically include large numbers of identical components. For example, as discussed below, zipper manifold 30 includes a plurality of identical rotatable elbows 35. Specific individual rotatable elbows 30 may be identified in the drawings, or referenced in the discussion as elbows 30$a$, 30$b$, 30$c$, etc. to distinguish a particular elbow 30 from another elbow 30. The drawing figures also are not necessarily to scale. Certain features of the embodiments may be shown exaggerated in scale or in somewhat schematic form and some details of conventional design and construction may not be shown in the interest of clarity and conciseness.

DESCRIPTION OF ILLUSTRATIVE EMBODIMENTS

The invention, in various aspects and embodiments, is directed generally to fluid transportation systems and flow lines and to components used in those systems. More specifically, it is directed to swing valves having a pressure-fitted, replaceable seat sleeve that are used to control the flow of abrasive, corrosive fluids under high pressure at high flow rates and to tools for servicing those seat sleeves. Various specific embodiments will be described below. For the sake of conciseness, however, all features of an actual implementation may not be described or illustrated. In developing any actual implementation, as in any engineering or design project, numerous implementation-specific decisions must be made to achieve a developer's specific goals. Decisions usually will be made consistent within system-related and business-related constraints. Specific goals may vary from one implementation to another. Development efforts might be complex and time consuming and may involve many aspects of design, fabrication, and manufacture. Nevertheless, it should be appreciated that such development projects would be routine effort for those of ordinary skill having the benefit of this disclosure.

The novel valves, valve systems, and zipper manifolds typically will be used to connect process or flow units for temporary fluid transportation systems. They are particularly useful for temporary installations that must be assembled and disassembled on site, and which may be installed in various locations. Such systems are common in chemical and other industrial plants, on marine dredging vessels, strip mines, and especially in the oil and gas industry. Frac systems, such as those shown in FIG. 1, are a common application where temporary high-pressure flow lines are routinely assembled and disassembled at various sites to provide fluid conduits between process or flow units for different wells.

The novel swing valves are particularly suited for use in frac systems such as the system shown in FIG. 1 and may be assembled at various locations through the system. For example, the novel swing valves may be used in a first preferred embodiment 30 of the novel zipper manifolds of the subject invention. Zipper manifold 30 may be used in frac systems instead of zipper manifold 16. The high-pressure discharge from pumps 10 is manifolded in missile 13 of frac manifold 9, fed into a single flow line 14, and thence into zipper manifold 30.

Figure 2:
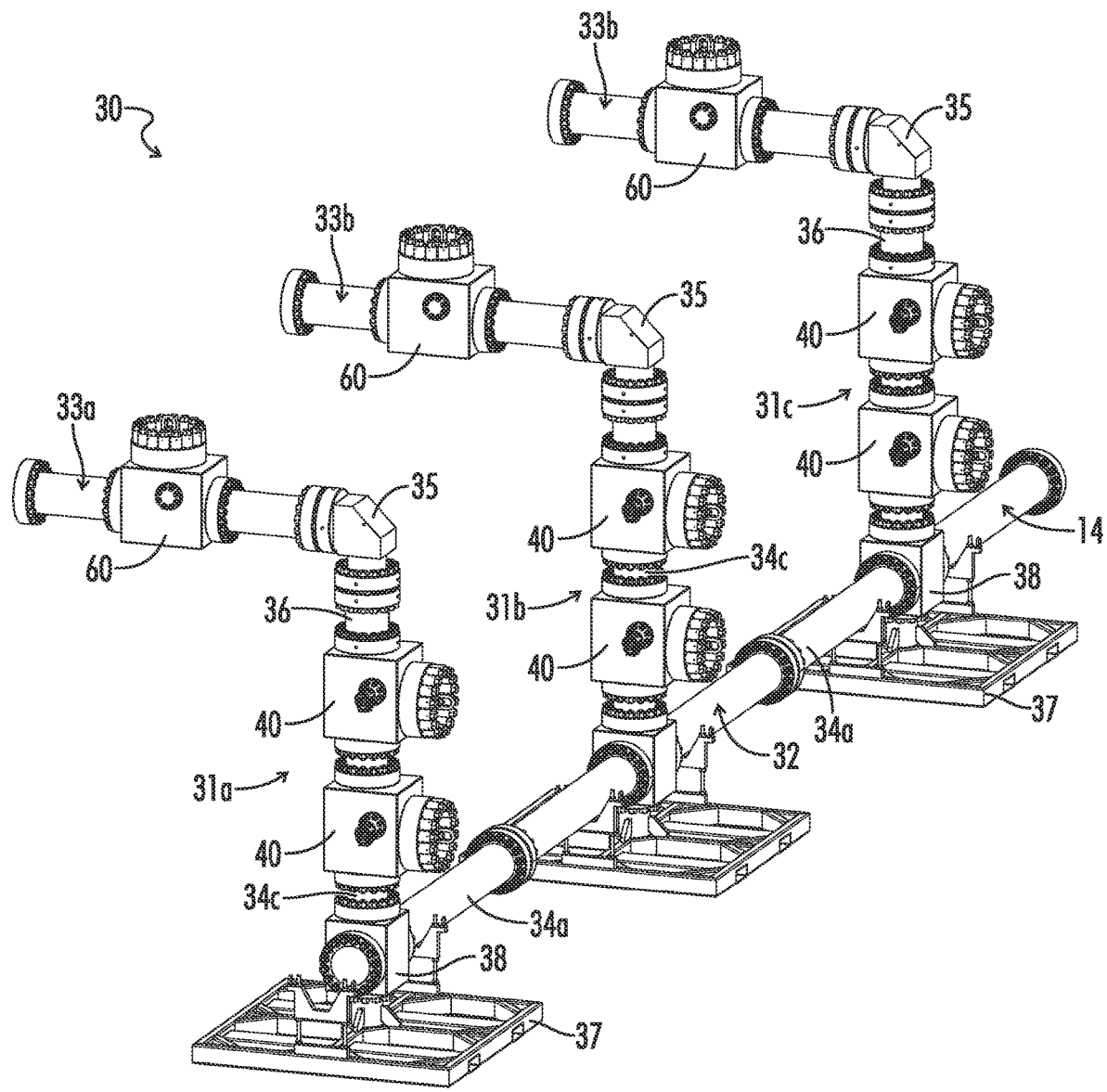
FIG. 2 is an isometric view, taken generally from above and to the left, of a first preferred embodiment 30 of the novel zipper manifolds of the subject invention incorporating a first preferred embodiment 31 of the novel valve assemblies.

Zipper manifold 30 is shown in FIG. 2. Like conventional zipper manifold 16, zipper manifold 30 can be used to selectively divert frac slurry into multiple well heads, for example, three well heads 19. Zipper manifold 30 incorporates a first preferred embodiment 31 of the novel valve assemblies. As described in further detail below, fluid may be selectively diverted into well heads 19 by selective operation of valves 40 in each wellhead flow line 33. For the sake of simplicity, well heads 19 are not shown in FIG. 2. It will be appreciated, however, that the novel flow lines may feed into any conventional wellhead assembly.

As shown in FIG. 2, zipper manifold 30 generally comprises a trunk line or distribution pipe 32 and three wellhead flow lines 33. Distribution pipe 32 comprises tee fittings 38 and relatively long spools 34a. Distribution pipe 32 preferably is mounted on one or more skids or other supports. For example, tee fittings 38 are mounted on pads 37. Pads 37 have cradles that support long spools 34a near their unions with tee fittings 38.

Long spools 34a are convention spools and are assembled between tee fittings 38 by conventional flange unions. As such they comprise a pipe which provides a conduit for conveying fluid. A pair of flanges are provided at each end of the pipe portion of spools 38a. Each flange has outer flat surfaces providing union faces. Bolt holes extend through the flanges and accommodate the passage of threaded connectors that are used to generate axial load across the union. Likewise, tee fittings 38 are provided with flange union faces allowing them to be joined by flange unions to long spools 34a and to their respective flow line 33. Flow through distribution pipe 32 may be diverted into selected wellhead flow lines 33 through tee fittings 38.

Other embodiments of the novel zipper manifolds, however, may incorporate other distribution pipes and systems for distributing fluid into the well head flow lines. Tee fittings, such as those disclosed in applicant's pending patent application, Ser. No. 16/443,730, filed Jun. 17, 2019, preferably are incorporated into the novel manifolds. Conventional tee fittings, however, may be used if desired to divert flow from the distribution pipe. A distribution loop, such as those disclosed in applicant's aforementioned '730 application, also may be used to receive and distribute flow to the well head flow lines.

Wellhead flow lines 33 each generally comprise valve assembly 31, along with upstream connections to distribution pipe 32 and downstream connections to their respective well head 19. As will be appreciated from the discussion that follows, valve assemblies 31 in zipper manifold 30 can be used to selectively divert flow into one of the three flow lines 33 and well heads 19. For example, flow may be selectively diverted through well head flowline 33c by setting valve assemblies 31a and 31b in a shut-off condition and setting valve assembly 31c in a check condition.

Figure 3:
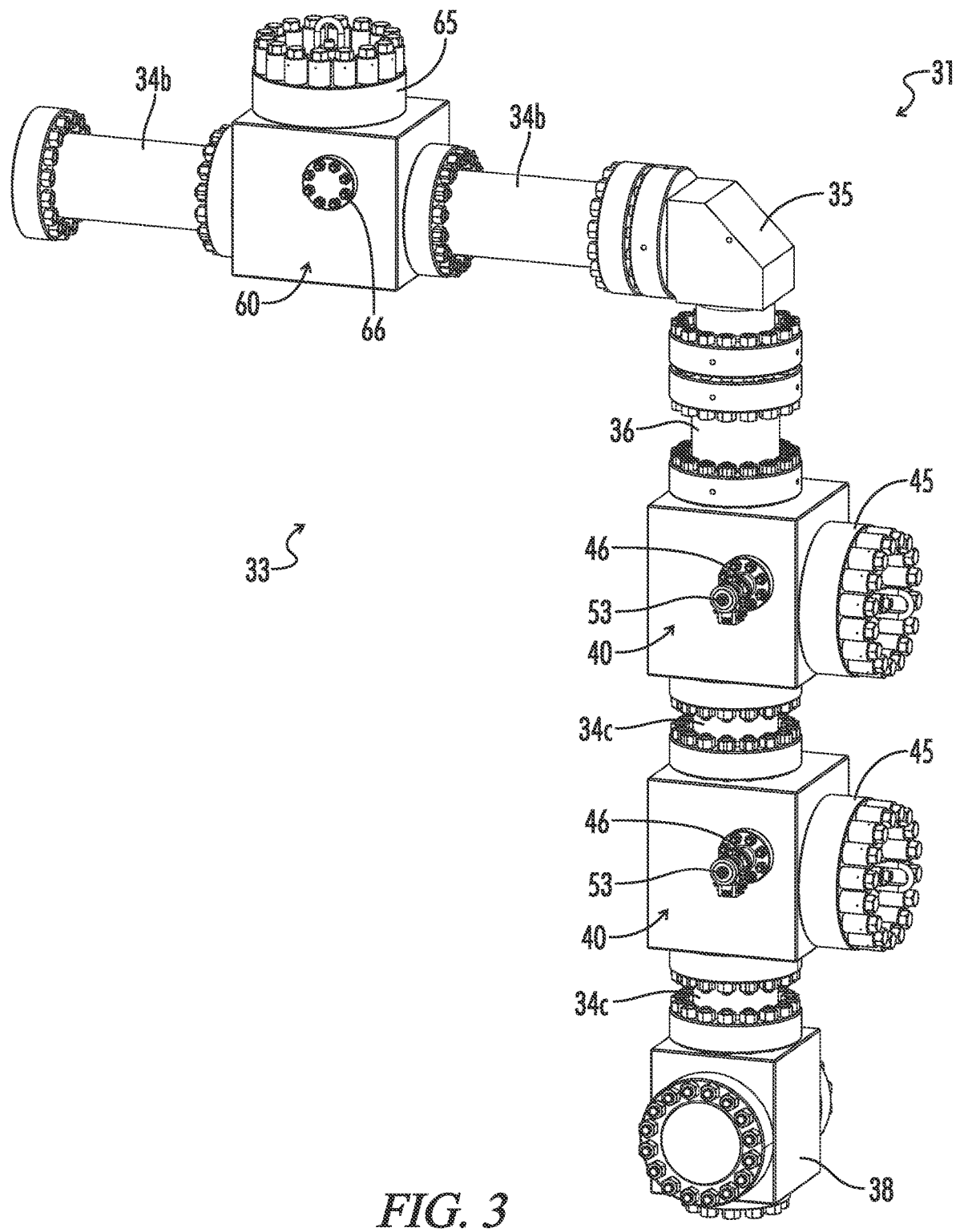
FIG. 3 is an enlarged isometric view of zipper manifold 30 shown in FIG. 2 showing one of the zipper flow lines 33 that will be connected to well heads 19, which portion incorporates novel valve assembly 31 which in turn includes first preferred embodiments 40 of the novel pivot valves and a first preferred embodiment 60 of the novel flapper valves.

Valve assemblies 31 comprise a collection of swing valves, and specifically, a pair of a first preferred embodiment 40 of the novel pivot valves and a first preferred embodiment 60 of the novel flapper valves. In addition to valves 40 and 60, each flow line 33 comprises a pair of short spools 34c, a rotatable spool 36, a rotatable elbow 35, and a pair of medium spools 34b. More specifically, as shown in FIGS. 2 and 3, pivot valves 40 are assembled into a vertical run portion of flow lines 33. Short spools 34c connect pivot valves 40 to each other and to tee fitting 38. Upper pivot valves 40 are joined to rotatable spools 36 which in turn are joined to rotatable elbows 35. Rotatable elbows 35 lead into a horizontal run comprising medium spools 34b and flapper valve 60. Preferably, as exemplified, rotatable elbows 35 and rotatable spools 36 are provided with union faces and threaded studs allowing them to be assembled into flow lines 33 through flange unions.

Rotatable elbows 35 and rotatable spools 36 allow relative rotation with and between the other flowline components to which they are assembled. Their construction will not be discussed in detail, but suffice it to say that they provide greater flexibility in laying out and making up valve assemblies 31 and well head flow lines 33. Additional rotatable elbows 35, for example, may be used to provide even greater flexibility.

Rotatable elbows 35 may incorporate rotatable flanges of conventional design, such as disclosed in U.S. Pub. No. 2007/0114039 A1 of M. Hobdy et al., or they may be a rotatable elbow as disclosed in applicant's U.S. Pat. No. 10,995,561 to T. Travis et al. Rotatable spools 36 also are disclosed in applicant's aforementioned '561 patent. Other conventional directional fittings and conduits, however, may be used to provide flexibility in connecting valve assemblies 31 to distribution pipe 32 and to well heads 19. For example, various combinations of angled shims, standard spools, and offset spools may be used as described in applicant's U.S. Pat. No. 10,538,973 to L. Hill et al. Conventional swivel joints also may be used.

Figure 4A:
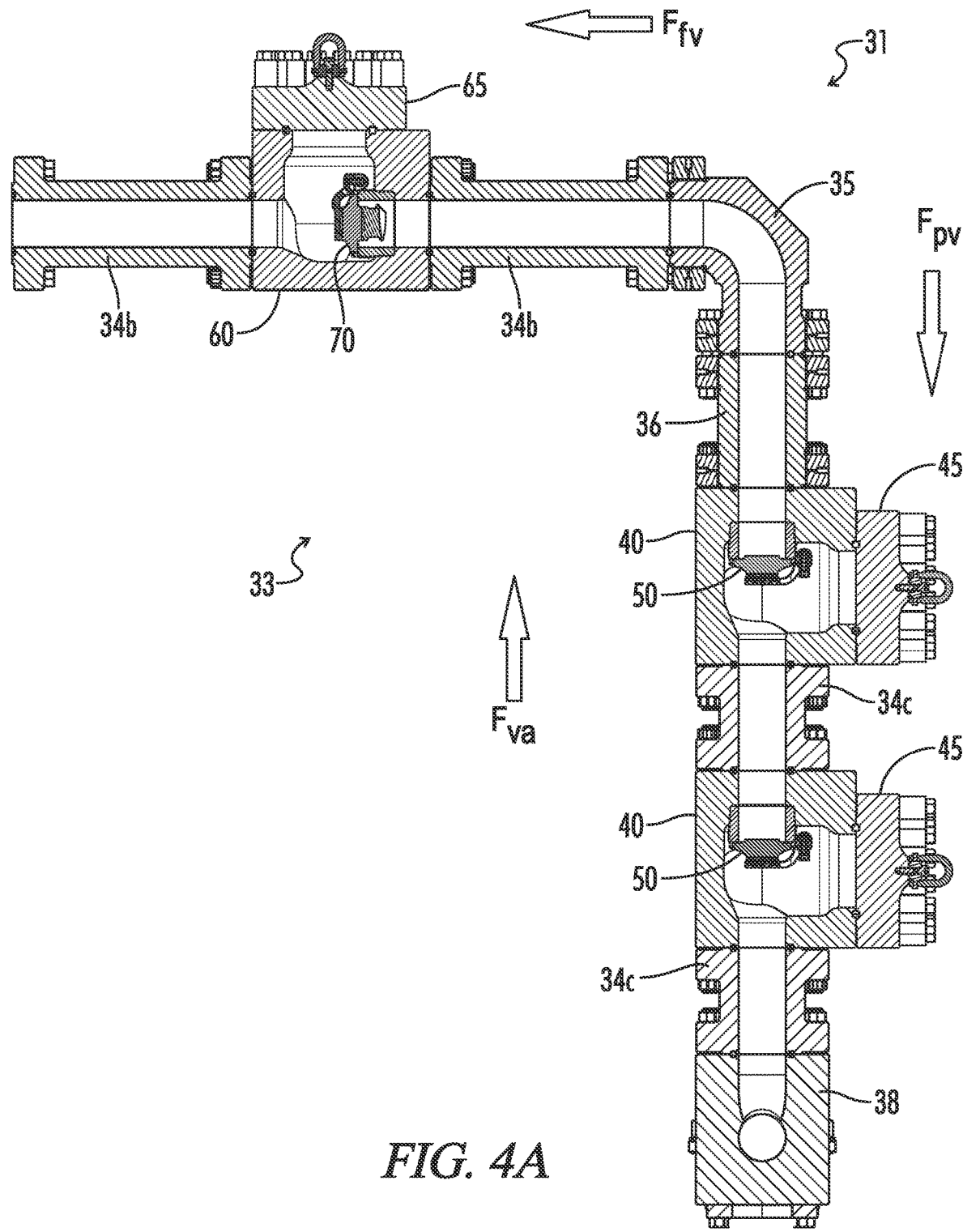
FIG. 4A is a cross-sectional view of flow line 33 shown in FIG. 3 taken generally along its primary axis showing valve assembly 31 in its shut-off condition, in which shut-off condition pivot valves 40 are in their shut-off mode.
Figure 4B:
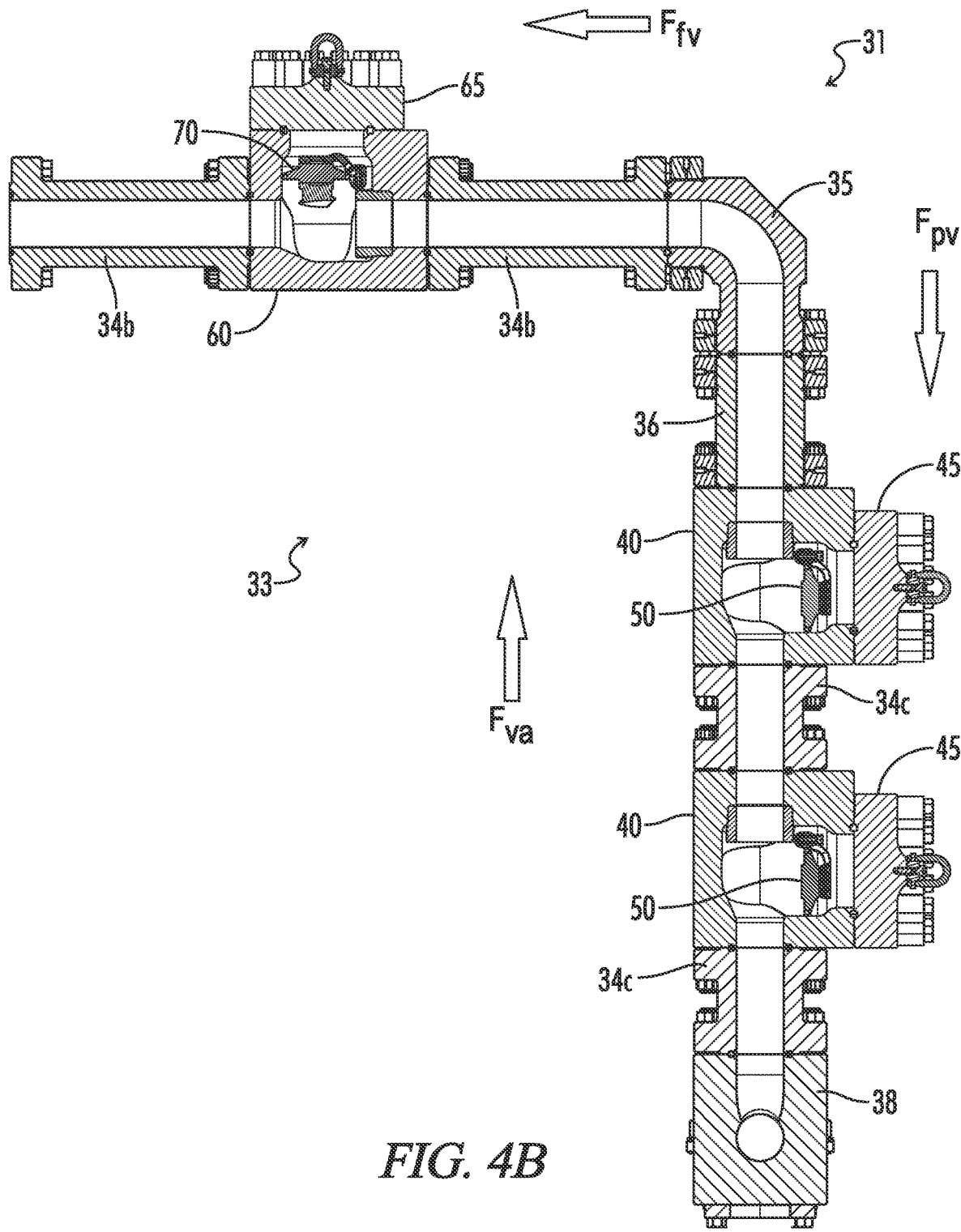
FIG. 4B is a cross-sectional view as in FIG. 4 except that valve assembly 31 is in its check condition, in which pivot valves 40 are in their open mode.
Figure 5A:
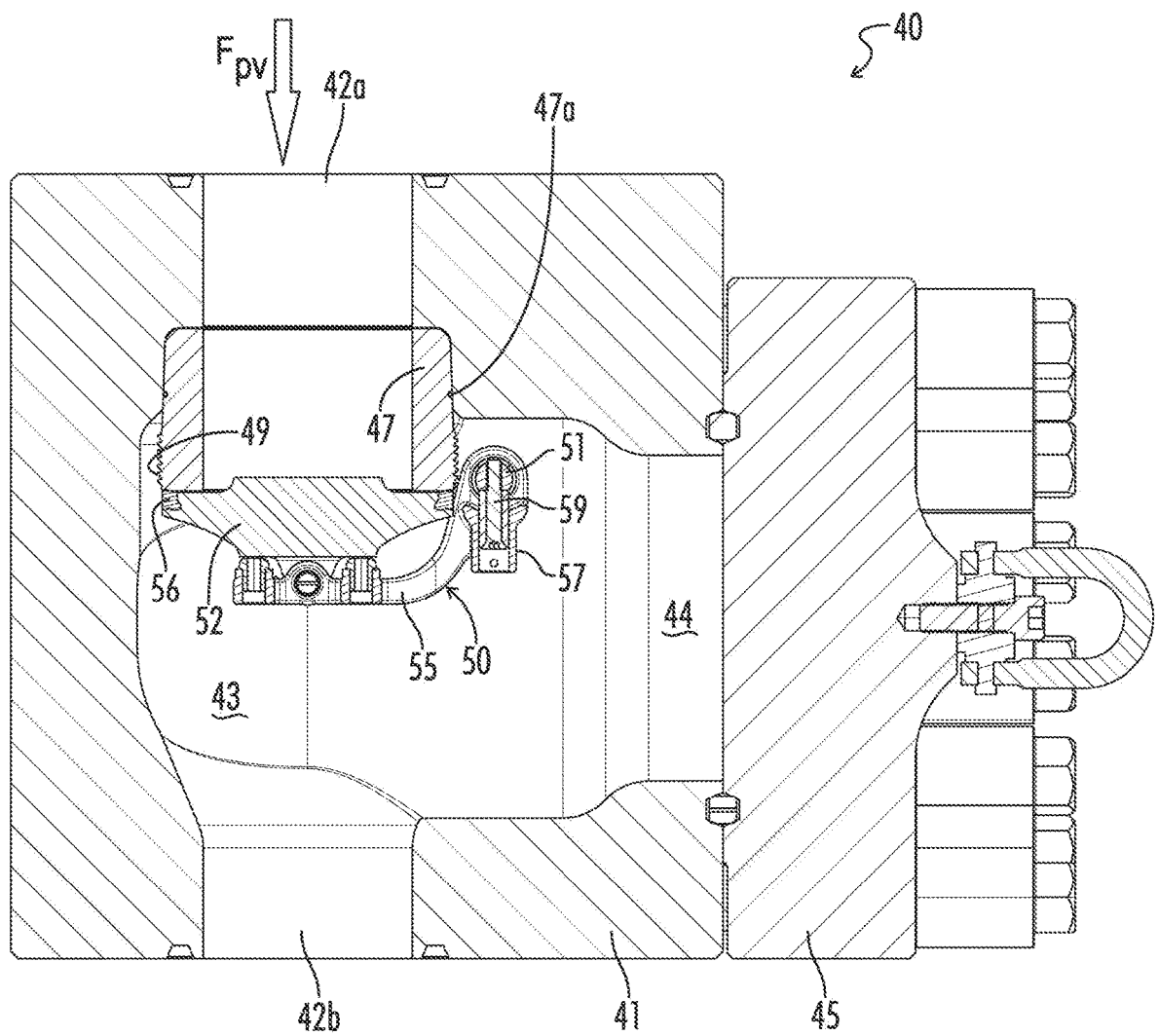
FIG. 5A is a cross-sectional view of pivot valve 40 in its shut-off mode with swing closure 52 being in its shut-off position.
Figure 5B:
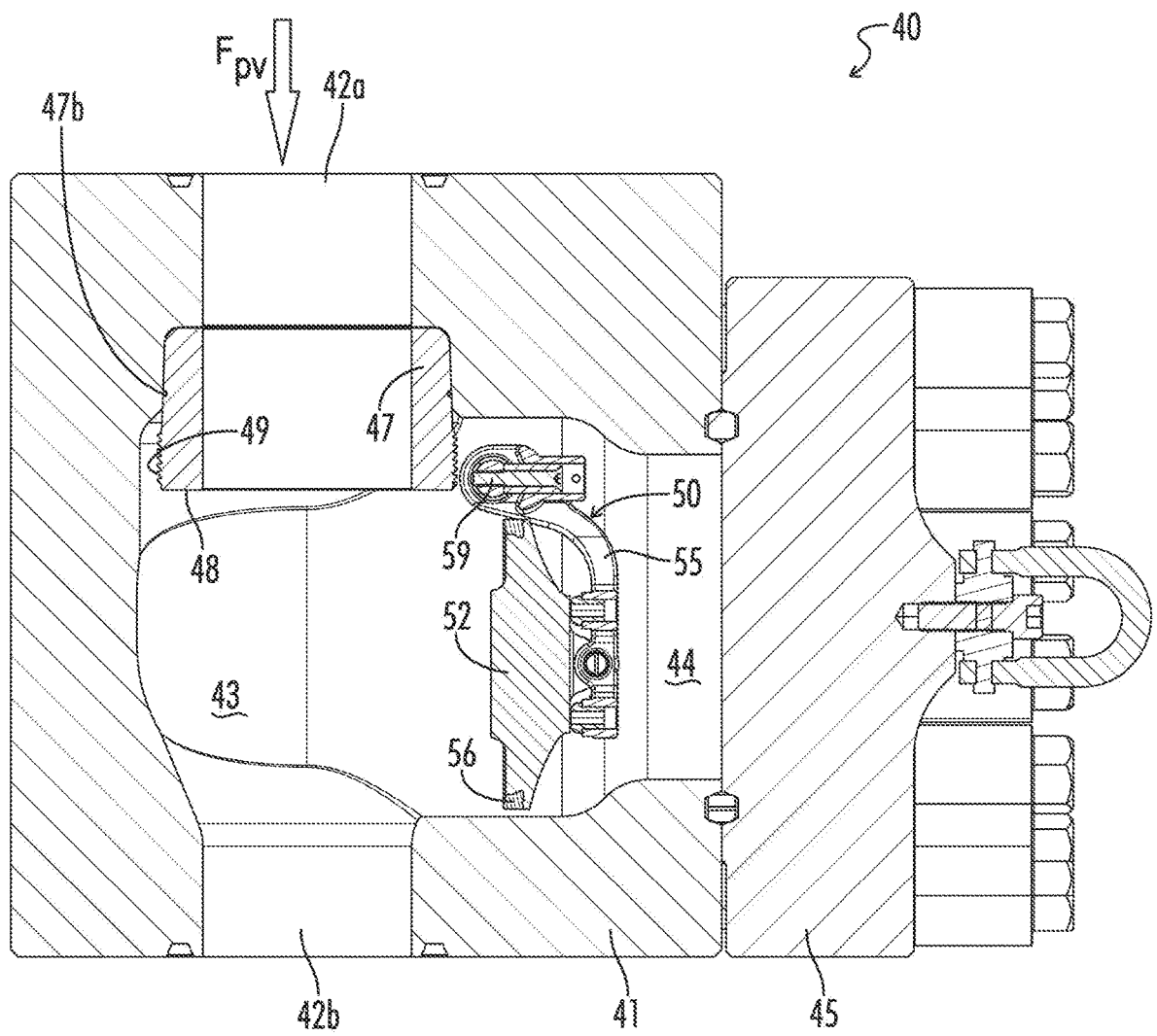
FIG. 5B is a cross-sectional view of pivot valve 40 in its open mode.

Pivot valve 40 is shown in greater detail in the cross-sectional views of FIGS. 4 and 5. FIGS. 4A and 5A show pivot valve 40 in a shut-off mode, and FIGS. 4B and 5B show valve 40 in an open mode. As may be seen therein, pivot valve 40 generally comprises a valve housing 41 in which is mounted a first preferred embodiment 47 of the novel valve seat sleeves of the subject invention and a closure assembly 50. Closure assembly 50 includes a swing closure 52 that can bear on a seat 48 on sleeve 47 to shut off flow through valve 40, or that can be pivoted away from seat 48 and held open to allow flow.

Housing 41 provides the primary structure or base to which other components of a flow line will be connected, and to which the other components of valve 40 will be assembled. It also defines a passage through valve 40. More specifically, housing 41 is provided with a vertically extending inlet bore 42a and a vertically extending outlet bore 42b which communicate with each other through a closure chamber 43. Bores 42 and closure chamber 43 may be shaped and configured as in conventional flapper valves, typically with a view towards minimizing turbulence through valve 40. Closure chamber 43 preferably will accommodate, but closely fit the pivoting movement of swing closure 52.

A service port 44 extends horizontally through the upper portion of housing 41 from closure chamber 43. Service port 44 provides access to closure assembly 50 and sleeve 47 so that they may be replaced or serviced. It preferably will be sized and configured accordingly. A bonnet 45 is joined to housing 41 over service port 44 by a flange union. It will be noted that there is no precise boundary between service port 44 and closure chamber 43. They are essentially one continuous chamber. A distinction is made herein, however, to demarcate service port 44 as an area in large part removed from the main flow of fluid passing from inlet bore 42a, through closure chamber 43, and into outlet bore 42b. When bonnet 45 is installed, service port 44 becomes a blind chamber. While eddy currents will form within service port 44, the main flow of fluid through pivot valve 40 will flow below service port 44.

Novel valve seat sleeve 47 is a relatively short, open-cylindrically shaped component. It is removably mounted in a receptacle in inlet bore 42a, that is, an enlarged, inner diameter portion of inlet bore 42a, by a frictional or pressure fit. Preferably, a seal, such as an elastomeric O-ring 47a, is mounted in a gland provided either on the inner circumference of the receptacle or the outer circumference of sleeve 47. As seen best in FIGS. 5, the outer (upper) end of sleeve 47 is pressure fitted into the receptacle in inlet bore 42a. The inner (lower) end of sleeve 47 projects out of the receptacle and inlet bore 42a into closure chamber 43.

Annular seat 48 is provided on the face of the inner end of sleeve 47. Seat 48 extends in a plane perpendicular to the primary axis of sleeve 47. The inner end of sleeve 47, however, may be beveled to provide an angled seat. An angled seat will encourage the swing closure to rest against the seat in its shut-off mode in flow lines where pivot valve 40 is assembled into a horizontal run. Importantly, and in accordance with this preferred embodiment of the invention, external threads 49 are provided on the inner end of sleeve 47. As discussed further below, external threads 49 allow sleeve 47 to be coupled to preferred embodiments of the novel valve seat sleeve engagement tools of the subject invention.

Figure 6A:
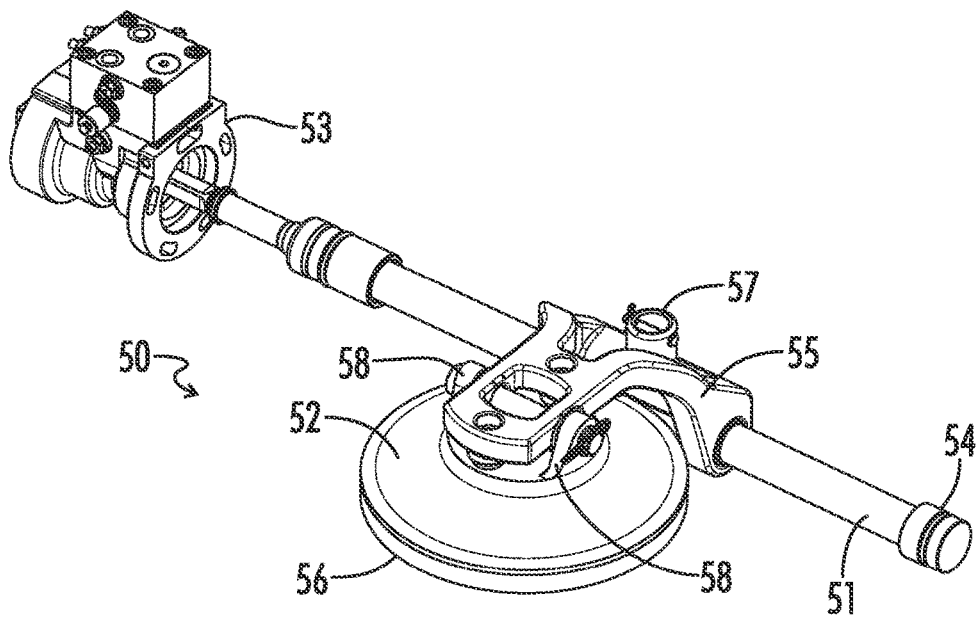
FIG. 6A is an isometric view, taken slightly off axis and above, showing closure assembly 50 of pivot valve 40.
Figure 6B:
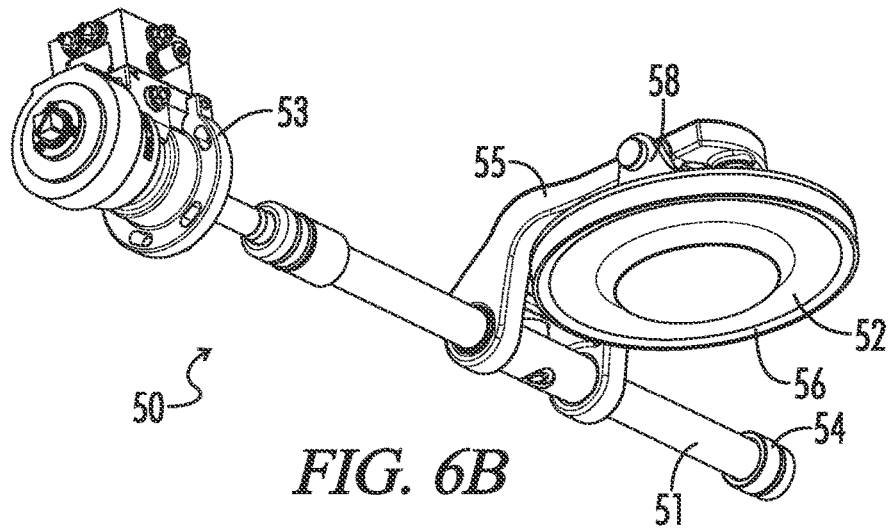
FIG. 6B is an isometric view, taken slightly off axis and below, showing closure assembly 50 of pivot valve 40.
Figure 6C:
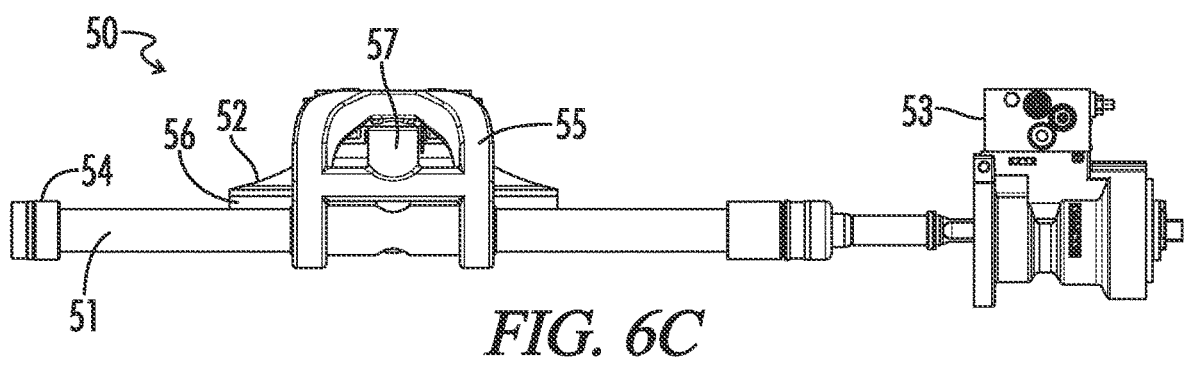
FIG. 6C is a top, plan view of closure assembly 50 of pivot valve 40.

As best seen in FIGS. 6, closure assembly 50 generally comprises an axle 51, swing closure 52, a closure arm 55, and a hydraulic actuator 53. Axle 51 is mounted in housing 41 for rotation. Preferably, as discussed further below, axle 51 is mounted in service port 44 somewhat to the side and above the face of seat 48. Axle 51 otherwise may be mounted for rotation and sealing by any conventional mechanism. For example, one end of axle 51 may be provided with a bearing assembly 54 that fits within a recess (not shown) provided in an interior wall of service port 44. The other end extends to the exterior of valve 40 through an opening in an opposing wall of service port 44 and an opening in an axle bonnet 46. Axle bonnet 46 may be seen best in FIG. 3. It is mounted to housing 41 by a flange union and will be provided with conventional annular packings (not shown) to facilitate sealing around and rotation of axle 51.

Swing closure 52 is a generally disc-like body similar to flappers used in conventional flapper valves and other swing valves. Many such designs are known and may be used in the novel pivot valves. For example, closure 52 preferably is provided with an annular, elastomeric seal 56 extending around the periphery of the face of closure 52 to assist in forming an effective seal between closure 52 and seat 48. Coatings or coverings also may be applied to closure 52 to protect it from erosion, or in lieu of an elastomeric seal to assist in forming an effective seal. For example, it may be provided with a rubber covering, such as carboxylated nitrile butadiene rubber (XNBR) or urethane rubber.

Swing closure 52 is mounted to axle 51 by closure arm 55. Closure arm 55, when viewed as in FIG. 5A, has an arcuate profile. It curves away from axle 51 and into closure chamber 43. Though an integral component, as appreciated from FIGS. 6, it may be viewed as comprising a pair of symmetrical, longer members spaced apart by three shorter connecting members. One end of closure arm 55 is fixedly coupled to axle 51, the other end to closure 52.

More specifically, the axle end of closure arm 55 has a pair of relatively widely spaced knuckles providing openings through which axle 51 passes. A short tube 57 extends perpendicularly from the connecting member between the knuckles on closure arm 55. Tube 57 is aligned with and communicates with a passage extending through the connecting member and a passage extending through axel 51. A pin assembly 59 is provided to position and fixedly couple closure arm 55 to axle 51. Pin assembly 59 generally comprises a spacer sleeve carried around axle 51 and extending between the knuckles, an alignment sleeve extending through tube 57 and its associated passage and an aperture in the spacer sleeve, and a pin extending through those components and the through-passage in axle 51.

Swing closure 52 is pivotally mounted to the other end of closure arm 55. More specifically, the closure end of closure arm 55 provides a pair of aligned passages. Closure 52 is provided with a pair of knuckles 58 extending from its back side. A pin extends through the aligned passages at the closure end of closure arm 55 and knuckles 58 on closure 52. Closure 52 thus is pivotally mounted to closure arm 55.

When valve 40 is in its shut-off mode, as shown in FIGS. 4A and 5A, closure 52 is held in a horizontal shut-off position against seat 48 on sleeve 47. Because it is pivotally mounted to closure arm 55, closure 52 is able to seat more effectively on seat 48. Fluid flowing into inlet bore 42a, in what may be termed the flow direction $F_{pv}$ of pivot valve 40, will be shut off by closure 52. Likewise, if fluid enters outlet bore 42b in a reverse-flow direction, closure 52 will be urged against seat 48 and shut off flow through valve 40. When valve 40 is in its open mode, however, as shown in FIGS. 4B and 5B, closure 52 is held downward, well to the side of flow through closure chamber 43. Thus, fluid is allowed to flow through valve 40 in both directions.

It will be appreciated that axle 51 is mounted somewhat to the side and above the face of seat 48. Closure arm 55 also is configured such that when valve 40 is set in its open mode, closure 52 is positioned to the side of the axis of axle 51 and beyond the main, high-velocity flow through valve 40. It is believed, therefore, that closure 52 will be less susceptible to erosion and other damage that may impair its ability to form an effective seal on seat 48.

Hydraulic actuator 53 can be actuated to set pivot valve 40 in either its shut-off or open mode. As will be appreciated by referencing FIGS. 3 and 6, hydraulic actuator 53 is connected to axle 51, and specifically, to the end of axle 51 that extends through housing 41 to the exterior of valve 40. Preferably, hydraulic actuator 53 is releasably connected to axle 51 to facilitate installation and removal of closure assembly 50. Hydraulic actuator 53 may be selectively rotated in both directions across an arc of approximately 90°, thus pivoting closure 52 on and off seat 48 on sleeve 47. Preferably, actuator 53 is connected to a wireless or other electronic control system that allows actuator 53 to be controlled remotely. A variety of conventional control systems are available and may be used.

It will be appreciated that closure assembly 50 provides a simple, reliable mechanism for placing valve 40 in its shut-off and open modes. Other mechanisms may be used, however, and closure assembly 50 may be modified in many respects as will be apparent to workers in the art. For example, the closure arm may have other configurations. It may be coupled to the axle by other pin assemblies, or it may be coupled to the axle to allow the valve to have a check mode in addition to its open mode. For example, the closure assemblies disclosed in applicant's aforementioned '730 application may be incorporated into the pivot valve. Other conventional closure assemblies may be used.

Similarly, hydraulic actuator 53 provides a reliable and effective way to control the operation of closure assembly 50. Hydraulic systems are widely used in fracturing operations and typically will be on site to control other hydraulic actuators in the frac system. Other conventional rotary actuators, however, may be used, such as electrically or pneumatically powered rotary actuators. Hand-powered or mechanical rotary actuators also may be used. For example, a handle assembly may be provided on the axle, such as those disclosed in applicant's '730 application.

Figure 7A:
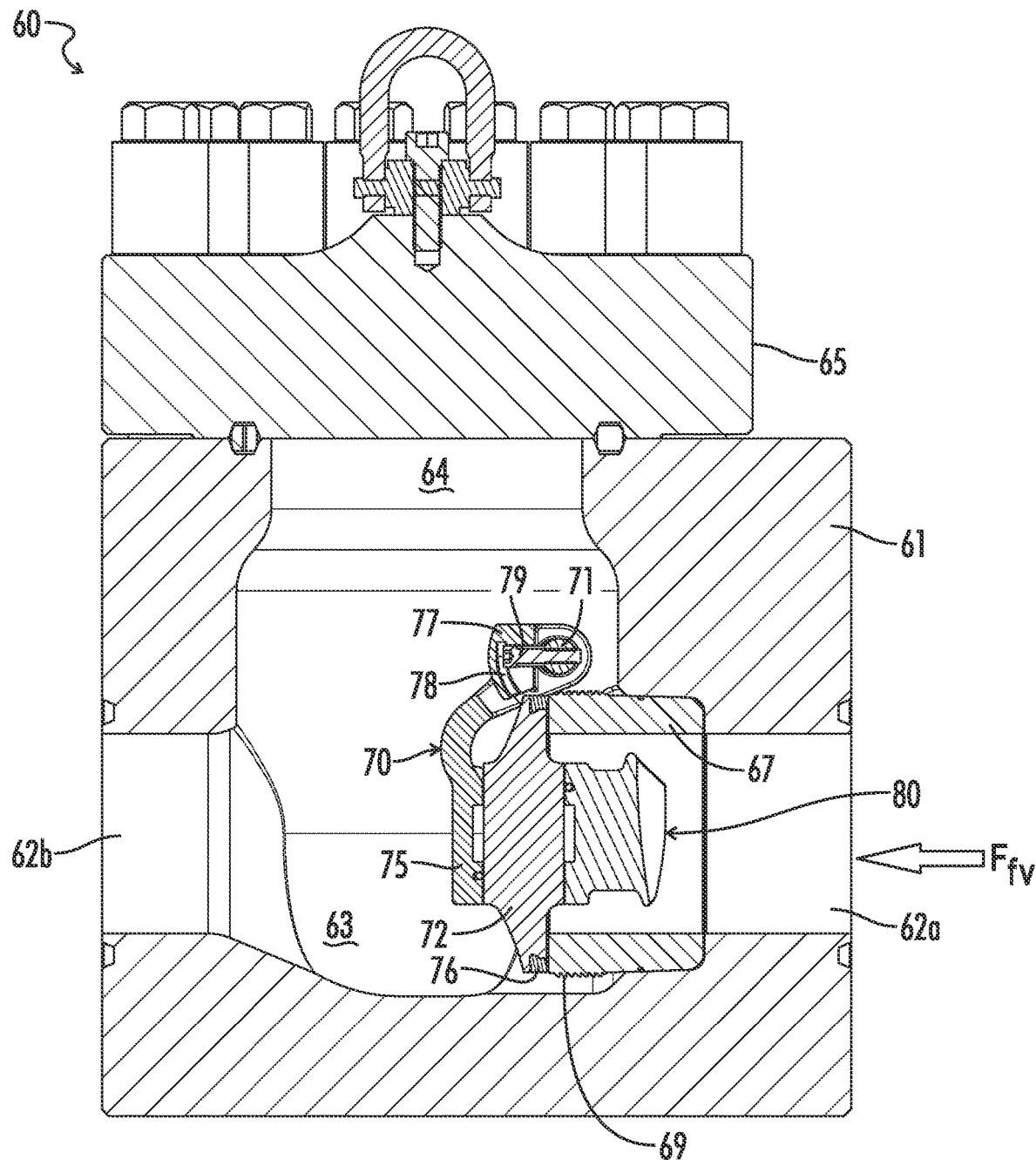
FIG. 7A is a cross-sectional view of flapper valve 60 with flapper 72 in its check position.
Figure 7B:
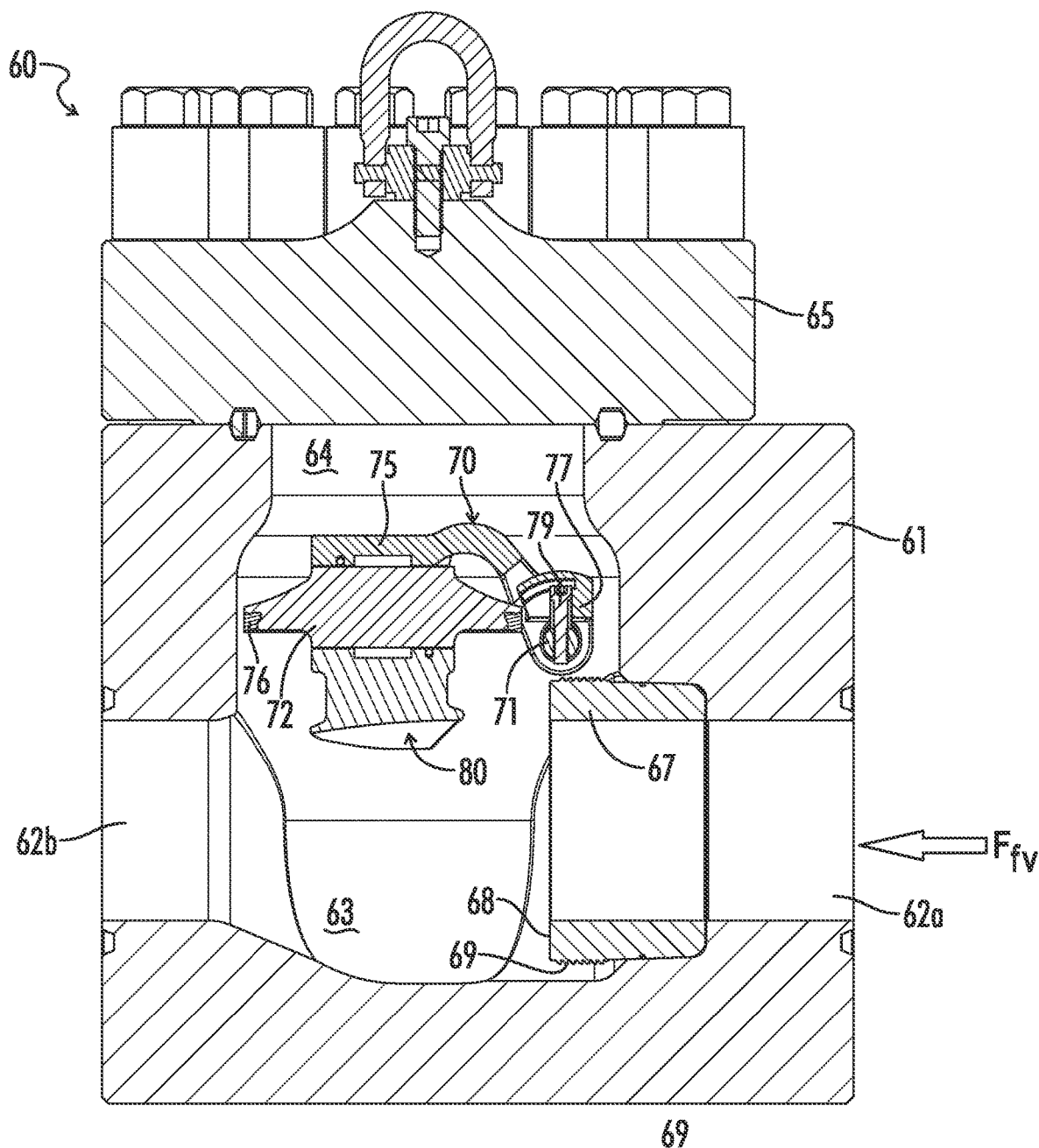
FIG. 7B is a cross-sectional view of flapper valve 60 with flapper 72 in its flow position.
Figure 8A:
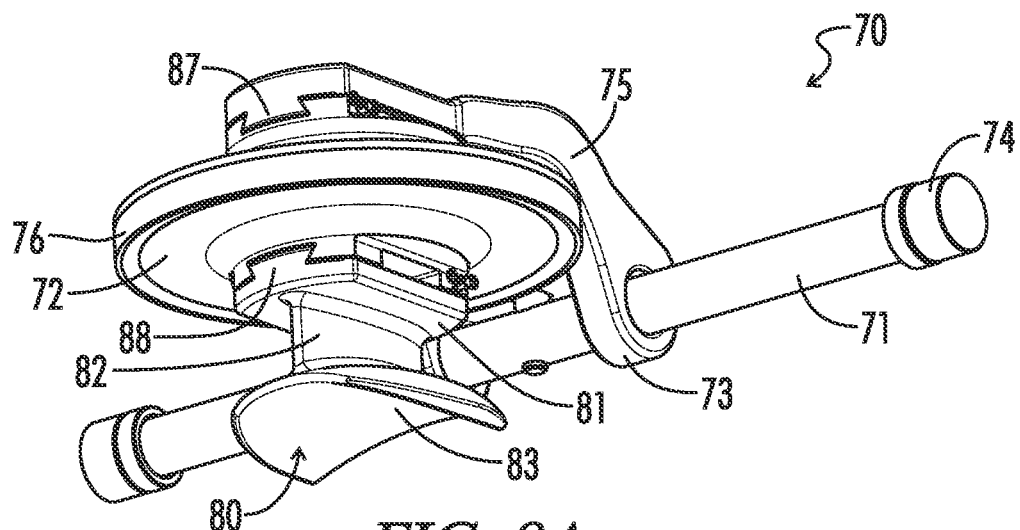
FIG. 8A is an isometric view, taken slightly off axis and below, of flapper assembly 70 of flapper valve 60.
Figure 8B:
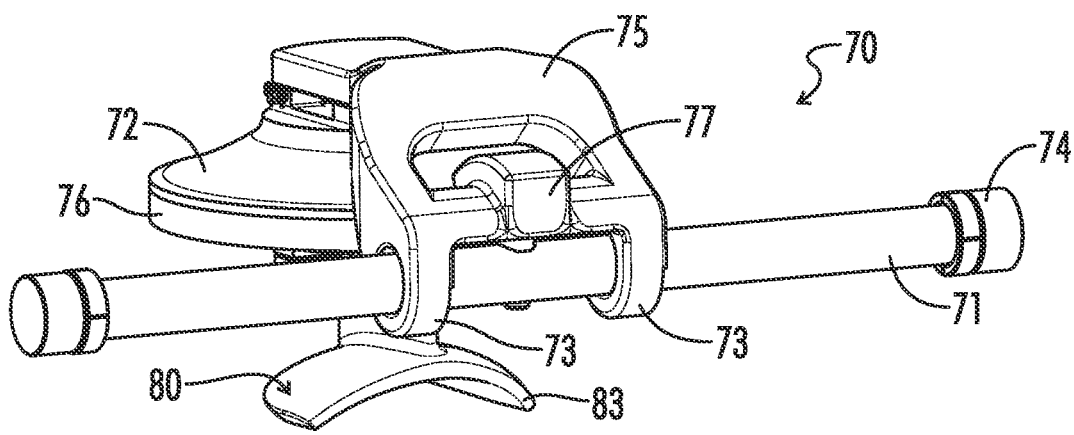
FIG. 8B is an isometric view, taken generally from the rear of flapper assembly 70 of flapper valve 60.
Figure 8C:
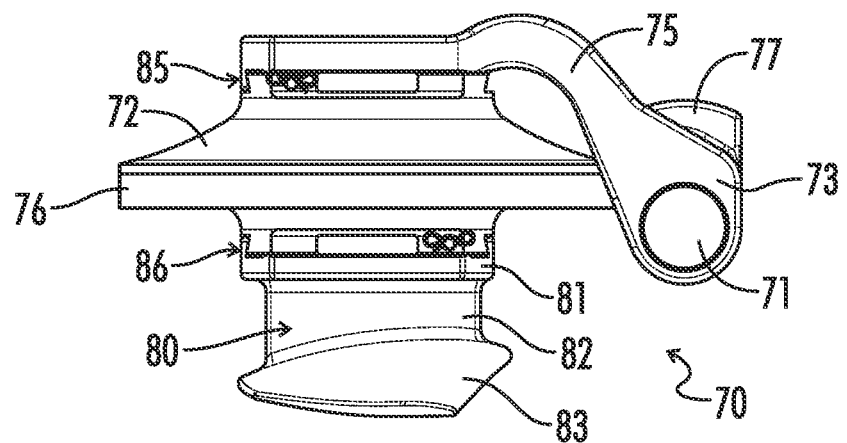
FIG. 8C is a side elevation view of flapper assembly 70 of flapper valve 60.

Flapper valve 60 is shown in greater detail in FIGS. 7-8. In many respects it is similar to pivot valve 40. Like pivot valve 40, flapper valve 60 generally comprises a valve housing 61 in which is mounted a closure assembly 70 (hereinafter referred to as flapper assembly 70) and a valve seat sleeve 67. Housing 61 provides the base or primary structure for valve 60. It is substantially identical to housing 41 of pivot valve 40 except in respect to those features allowing mounting of flapper assembly 70 instead of closure assembly 50. Housing 61 is provided with an inlet bore 62a, a closure chamber 63 (hereinafter referred to as flapper chamber 63), and an outlet bore 62b which form a passage through valve 60. A service port 64 extends into closure chamber 63 and provides access to flapper assembly 70 and sleeve 67. A bonnet 65 is provided to close service port 64.

Valve seat sleeve 67 of flapper valve 60 is identical to sleeve 47 of pivot valve 40. It is pressure fitted into a receptacle in inlet bore 62a. Its inner (right) end projects out of the receptacle into flapper chamber 63, the face of which provides an annular seat 68. In accordance with this preferred embodiment, external threads 69 are provided on the inner end of sleeve 47 and, as discussed further below, may be coupled to the novel valve seat sleeve engagement tools.

As best seen in FIGS. 8, flapper assembly 70, generally comprises an axle 71, a closure arm 75 (hereinafter referred to as a flapper arm 75), a swing closure 72 (hereinafter referred to as flapper 72), and a hydrofoil 80. Axle 71 is mounted in housing 61. Unlike axle 51 of pivot valve 40, however, axle 71 of flapper valve 60 need not be mounted for rotation. For reasons that will become apparent from the discussion that follows, it may be fixedly mounted in housing 61. For example, the ends 74 of axle 71 may be fitted into openings in the opposing walls of service port 64, the openings being covered by axle bonnets 66. Axle 71, in general, may be mounted in any conventional manner.

Flapper 72 is a generally disc-like body that is pivotally mounted to axle 71 by flapper arm 75. Like swing closure 52, flapper 72 preferably is provided with an annular, elastomeric seal 56 around the periphery of its face to assist in forming an effective seal with seat 68. Other features of conventional flappers may be provided on flapper 72 as desired.

Flapper arm 75 is similar to closure arm 55 in pivot valve 40. When viewed as in FIG. 7C, it curves away and down from axle 71. As appreciated from FIGS. 8, it may be viewed as comprising a generally solid rectangular end that is connected to flapper 72. The other end of flapper arm 75 is connected to axle 71. More specifically, the axle end of flapper arm 75 is split into a pair of symmetrical extensions joined by a connecting member. The extensions provide a pair of knuckles 73 at their terminus, each providing an opening through which axle 71 may pass. Knuckles 73 allow flapper 72 to pivot freely relative to axle 71. A projection 77 on the connecting member provides an arcuate track 78 generally facing axle 71. A pin assembly 79 is assembled to axle 71. Pin assembly 79 travels into and out of track 78 as flapper 72 pivots about axle 71, thus helping to align flapper 72 and ensure that it seats properly on seat 68. Pin assembly 79 may comprise, for example, a spacer tube and a pin extending through the spacer tube and into axle 71.

Flapper 72 of valve 60 will tend to hang down and against seat 68 on sleeve 67 in a check position as shown in FIGS. 4A and 7A. Fluid flowing into outlet bore 62a in a direction opposite to the flow direction $F_{fv}$ of flapper valve 60 will cause flapper 72 to bear against seat 68, thus checking reverse flow through valve 60. When fluid enters inlet bore 62a in the flow direction $F_{fv}$ of valve 60, however, it will flow against flapper 72. Flapper 72 will pivot away from seat 68 and upwards toward service port 64, as may be seen in FIGS. 4B and 7B. It will tend to float above the flow through flapper chamber 63.

Preferably, as exemplified, flapper 72 is provided with a hydrofoil 80. Hydrofoil 80 will enhance the tendency of flapper 72 to float above the main flow passing through valve 60 and minimizing exposure of its face to the abrasive fluid flowing underneath it. As seen best in FIGS. 8, hydrofoil 80 comprises a base 81, a strut 82, and a wing 83. Base 81 allows hydrofoil 80 to be mounted to flapper 72. Strut 82 extends generally normally from base 81 and supports wing 83 away from flapper 72. Strut 82 preferably will be shaped to minimize resistance and to encourage laminar flow around it. Wing 83 will have a shape to provide lift to flapper 72 as it pivots away from seat 68 and then to stabilize flapper 72 in a more or less horizontal position within service port 64.

In accordance with a preferred embodiment of the invention and as exemplified herein, flapper 72 is connected to flapper arm 75 by a dovetail joint 85, and hydrofoil 80 is connected to flapper 72 by a dovetail joint 86. As seen best in FIGS. 8A and 8B, the face of the flapper end of flapper arm 75 is provided with a pin or tongue 87 that extends into a tail or socket provided on the backside of flapper 72. Base 81 of hydrofoil 80 similarly is provided with a pin 88 that extends into a tail provided on the face of flapper 72. Dovetail joints 85 and 86 may be tapered joints to allow a frictional engagement, respectively, between flapper arm 75 and flapper 72 and between flapper 72 and hydrofoil 80. Set screws also may be used to ensure the integrity of dovetail connections 85 and 86.

Because frac systems are required at a site for a relatively brief period of time, the novel valves, like other frac iron components, preferably are joined to other flowline components by unions. Unions allow the components to be connected ("made up") and disconnected ("broken down") relatively quickly. Thus, as exemplified, housing 41 and 61 of, respectively, pivot valve 40 and flapper valve 60 are provided with flange union faces allowing them to be assembled to other flowline components by a flange union. Housings 41 and 61, however, may be provided with other subs allowing valves 40 and 60 to be joined by other conventional unions, such as hammer (or "Weco®") unions or clamp (or "Greyloc®") unions. They also may be provided with threaded connections.

Housings 41 and 61 also preferably have a generally polyhedral or prismatic shape, such as the exemplified cubic shape. Polyhedral shapes allow the housings to be provided easily with flange union faces. They may have other designs, however, such as generally tubular designs more amenable to incorporation of subs for hammer and clamp unions. Such tubular designs also may incorporate flanges for flange unions. Moreover, while a unitary housing is usually preferred, housings 41 and 61 also may be assembled from two or more components. As a further example, a hammer union or clamp union sub may be fabricated separately and assembled to a base or core component to allow the novel valves to be joined by other types of unions.

It will be appreciated that the novel valve may be modified in various other ways consistent with the invention. For example, pivot valve 40 or flapper valve 60 may be provided with a bleeder port allowing a pressure relief valve to be assembled to the valve. Flange union faces may be provided around the port to allow the valve or a valve assembly to be joined to the junction by a flange union. A port also may be provided to allow assembly of a gauge, such as a pressure or flow gauge, to valves 40/60.

Thus, it will be appreciated that the novel flapper valves, such as exemplified valve 60, have similar features and operate in many respects as do conventional flapper valves. They may be installed in a line to allow flow in a flow direction and to check flow in the opposite direction. The novel dovetail joints, however, allow the flapper to be securely and reliably mounted to flapper arm while at the same time allow easy replacement of worn flappers. Likewise, when a hydrofoil is provided, the same ease and reliability of replacing a worn hydrofoil is provided by the novel dovetail joints. In other embodiments, the flapper assembly may have other types of connections between the flapper, flapper arm, and hydrofoil, such as those disclosed in applicant's '730 application. In other embodiments, dovetail joints may be used to connect the closure to a closure arm in other types of swing valves, such as pivot valves.

Likewise, flapper assembly 70 as exemplified in flapper valve 60 provides a simple, reliable mechanism for allowing flow through valve 60, but checking flow in the reverse direction. Other mechanisms may be used, however, and flapper assembly 70 may be modified in many respects as will be apparent to workers in the art. For example, the flapper arm may have other configurations. It may be coupled to the axle by other pin assemblies. For example, the flapper assemblies disclosed in applicant's '730 application referenced above may be incorporated into the flapper valve. In certain embodiments, the flapper assembly need not incorporate a hydrofoil.

As will be appreciated from the discussion above, as used herein "swing valve" is intended to refer to a valve having a valve closure that "swings" or "pivots" on and off a valve seat. It is intended as a generic descriptor encompassing both "pivot valves" and "flapper valves." "Pivot valve" as used herein is intended to describe a swing valve such as pivot valve 40 in which the swing closure may be supported above or otherwise outside the main flow through the pivot valve. The pivot valve thus may be set in an open mode allowing flow in either direction through the valve. The swing closure also may be set in a shut-off mode in which it is positioned downward, against the valve seat. Flow through the valve is shut off in both directions. Alternately, the swing closure may set in a check mode, in which the swing closure is allowed to hang under the influence of gravity directly down and against the valve seat. When in its check mode, the swing closure pivots away from the seat in response to fluid flowing through the valve in a flow direction and checks flow through the valve in a reverse flow direction. "Flapper valve" as used herein is intended to describe a swing valve such as flapper valve 60 having only a check mode. The swing closure cannot be supported above the flow. It will pivot to allow flow through the valve in a flow direction and will bear against the seat to check flow in a reverse flow direction.

Similarly, "closure," both as a noun and an adjective, is intended broadly as a generic term encompassing and describing components of swing valves, including, for example, closure 52 of pivot valve 40 and flapper 72 of flapper valve 60. Terms such as "closure," "closure assembly," and "closure chamber" on the one hand, and "flapper," "flapper assembly," and "flapper chamber" on the other hand, for the sake of convenience and clarity also have been used in relation, respectively, to pivot valves, such as pivot valve 40, and flapper valves, such as flapper valve 60. It will be apparent to workers in the art from the context in what sense such terms have been used.

The swing valves of the subject invention may be used in a variety of high-pressure flow lines. The novel flapper valves, for example, may be employed in any system in which conventional flapper valves have been used. They may be used to particular advantage, however, in zipper manifolds. For example, as noted, valve assemblies 31 in wellhead flow lines 33 of zipper manifold 30 each comprise a pair of pivot valves 40 and a flapper valve 60 assembled in line. By selectively setting pivot valves 40 in their check or shut-off modes, valve assemblies 31 may be used effectively as a combined shut-off and check valve, allowing zipper manifold 30 to selectively divert flow into multiple well heads 19.

More particularly, as shown in FIGS. 4, pivot valves 40 are assembled into flow lines 31 in their reverse-flow orientation, that is, with their flow direction $F_{pv}$ oriented against the flow direction $F_{va}$ of valve assemblies 31 in flow lines 33. Flapper valves 60 are assembled in their flow orientation, that is, with their flow direction $F_{fv}$ oriented with the flow direction $F_{va}$ of valve assemblies 31. Thus, when pivot valves 40 are set in their shut-off mode, as shown in FIG. 4A, valve assembly 31 is in a shut-off condition. Flow in the flow direction $F_{va}$ of valve assembly 31 will be shut-off by pivot valves 40. Flow in the reverse-flow direction of valve assembly 31 will be checked by flapper valve 60. Flow in both directions through valve assembly 31 and flow line 33 is effectively shut off.

Valve assembly can be set to a check condition by setting pivot valves 40 in their open mode as shown in FIG. 4B. Closures 52 of pivot valves 40 are supported in service port 44, allowing reverse flow through pivot valves 40. Flapper 62 of flapper valve 60 will pivot upward into service port 64 to allowing flow through flapper valve 60, but will pivot downward against seat 68 to check reverse flow through valve 60. Flow is allowed through valve assembly 31 in its flow direction $F_{va}$, but checked in its reverse-flow direction.

Thus, it will be appreciated that zipper manifold 30 can be set to selectively divert flow through one of the three flow lines 33 into its associated well head 19. For example, to divert flow through flow line 33c, valve assemblies 31a and 31b are both in their shut-off condition, while valve assembly 31c is in its check condition. More specifically, pivot valves 40a and 40b in, respectively, flow lines 33a and 33b are all set in their shut-off mode. Flow is shut off through flow lines 33a and 33b. Pivot valves 40c in flow line 33c, however, are set in their open mode. Fluid from distribution pipe 32 is diverted into flow line 33c, for example, to fracture its associated well. Backflow from the fracturing operation, however, will be checked by flapper valves 60 in flow line 33c.

The novel valve assemblies have been exemplified as comprising a pair of pivot valves and a single flapper valve. Many operators may prefer the increased reliability provided by redundant valves, and thus the novel valve assemblies may comprise another flapper valve. Similarly, the pivot valves have been exemplified as assembled in a vertical run. They also may be incorporated in a horizontal run, for example, as disclosed in applicant's aforementioned '730 application.

It also will be appreciated that the novel zipper manifolds and flow lines may incorporate other conventional flowline components, such as pressure relief valves or bleed-off lines. They also may incorporate, for example, gauges and other monitoring equipment. Preferably, they also will incorporate ports allowing them to be flushed and cleaned out between operations. A flush-port assembly may be assembled to a fitting at a desired location. The novel valves and valve assemblies may be incorporated in a wide variety of zipper manifolds and other flow lines.

As noted, tee fittings 38 are mounted on pads 37. All or portions of the novel zipper manifolds also may be mounted on other frames for easy transport to and from a site and to allow more rapid assembly and disassembly of a system. For example, one or more valve assemblies 31 may be mounted on a skid. Zipper manifold 30 also may be mounted on a rolling chassis, such as a trailer. The frames also may incorporate assemblers facilitating the make-up and breakdown of the components mounted on the frame.

In accordance with preferred embodiments of the invention, pressure-fitted valve seat sleeves of the novel swing valves are adapted to couple with a cap that extends over and across the seat end of the valve sleeve to shut off flow through the sleeve. More particularly, the outer circumference of the seat end of the sleeve is coupled to the cap such that all or substantially all flow through the sleeve is cut off so that pressure can be built up behind the cap.

Figure 9A:
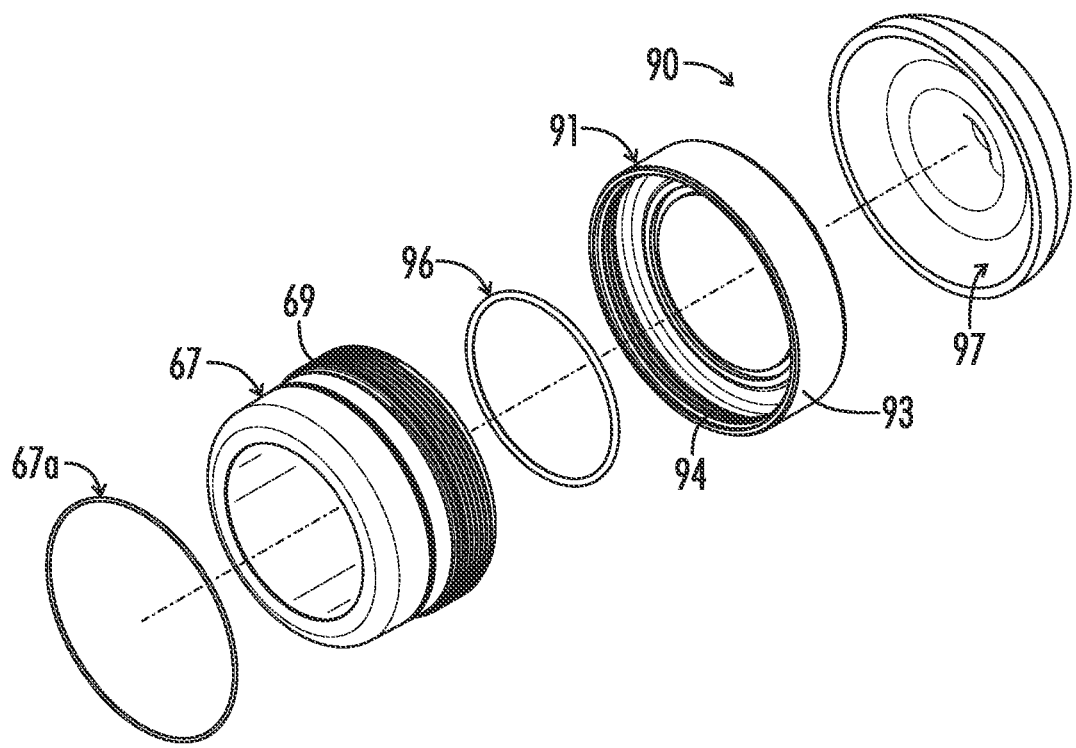
FIG. 9A is an exploded, isometric view, taken from one side, of a first preferred embodiment 67 of the novel valve seat sleeves and a first preferred embodiment 90 of the novel valve seat sleeve engagement tools.
Figure 9B:
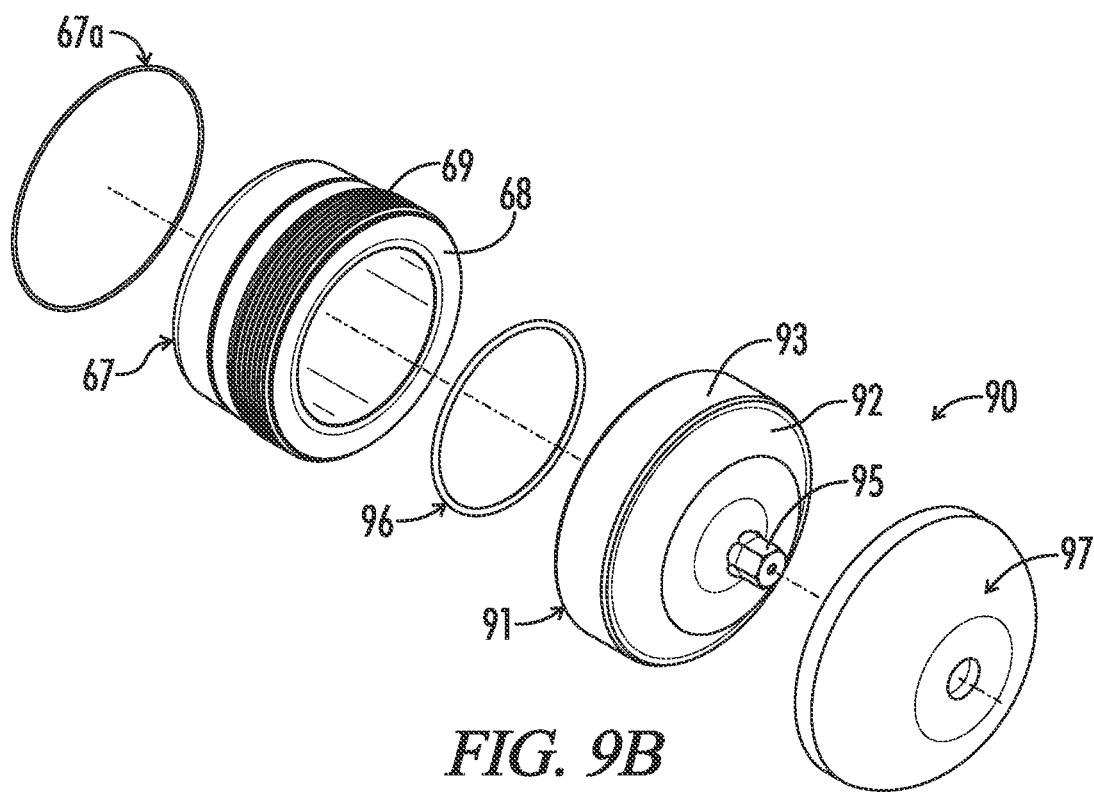
FIG. 9B is an exploded, isometric view, taken from the opposite side, of novel valve seat sleeve 67 and valve seat sleeve engagement tool 90.
Figure 10:
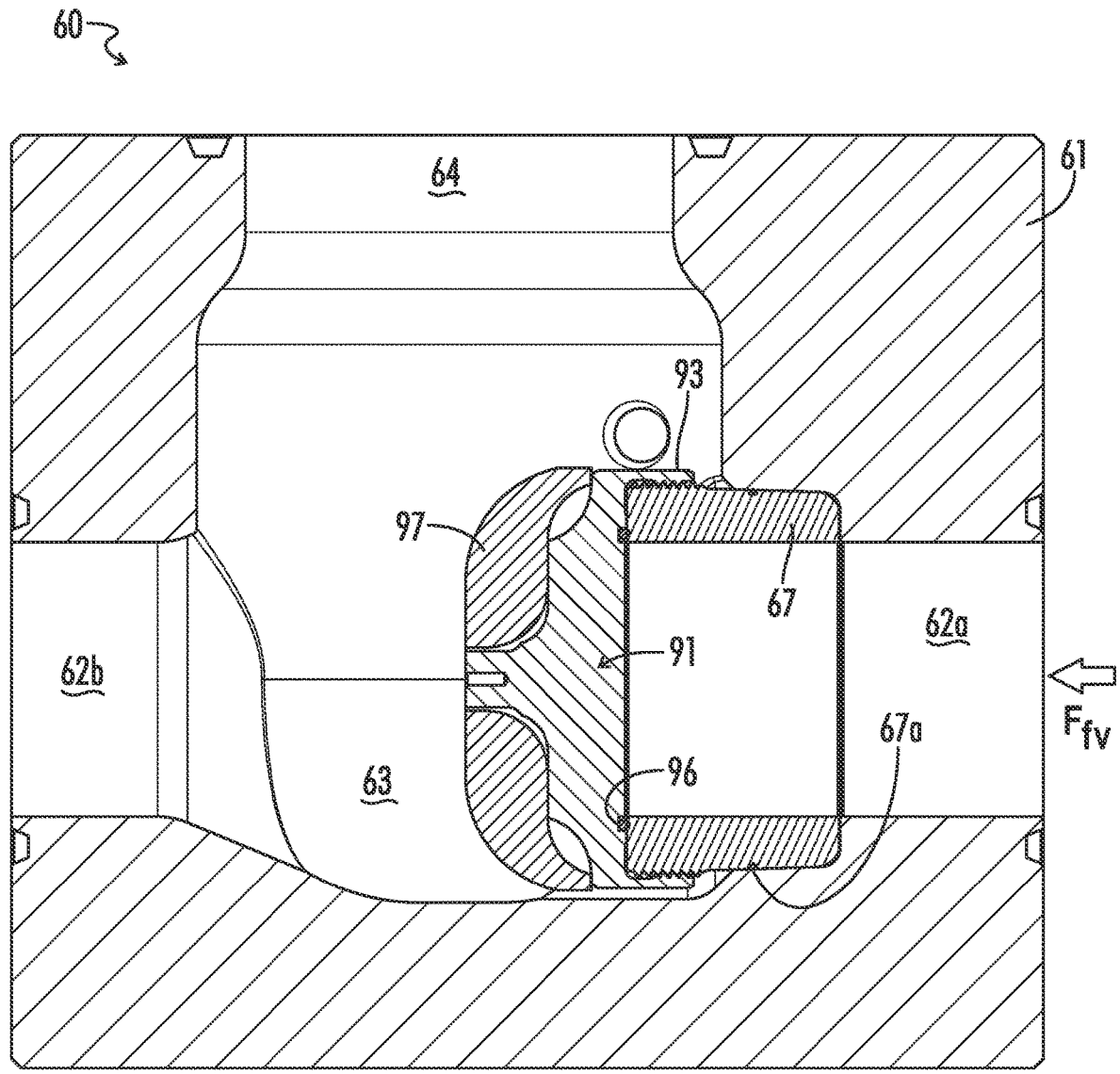
FIG. 10 is a cross-sectional view of flapper valve 60 with flapper assembly 70 having been removed and valve seat sleeve engagement tool 90 installed on novel valve seat sleeve 67.

For example, and as discussed above, the projecting, inner ends of valve seat sleeves 47 and 67 of, respectively, pivot valve 40 and flapper valve 60 have external threads 49 and 69. External threads 49/69 allow sleeves 47/67 to be coupled to novel valve seat sleeve engagement tools of the subject invention. For example, valve seat sleeve 67 of flapper valve 60 may be coupled to a first preferred embodiment 90 of the novel valve seat sleeve engagement tools as shown in FIGS. 9A, 9B, and 10.

As seen best in FIGS. 9, sleeve engagement tool 90 comprises a threaded cap 91. Threaded cap 91 may be viewed as having a circular top 92 from which depends a relatively short annular skirt 93. Annular skirt 93 is provided with internal threads 94 that engage external threads 69 on valve seat sleeve 67 as shown in FIG. 10. When coupled to sleeve 67, cap 91 extends over and across seat 68 and covers and shuts off flow through sleeve 67. A short stem 95 having a hexagonal cross-section extends from the center of the outside of top 92 of cap 91. Stem 95 thus may be engaged by a wrench to assist in threading cap 91 on sleeve 67. Other features for securely threading cap 91 on sleeve 67, however, may be used, if desired. For example, the outer circumference of skirt 93 may be beveled to provide faces that may be engaged by a wrench. The exterior of skirt 93 also may be machined to allow a strap wrench to engage cap 91 more easily.

Preferably, as exemplified, sleeve engagement tool 90 also comprises face seal 96 and a bumper cap 97. Face seal 96 is mounted in a gland on the interior face of top 92 of threaded cap 91. It provides a pressure seal between threaded cap 91 and seat 68 of sleeve 67. Other conventional seals, however, may be used. Bumper cap 97 fits over threaded cap 91. A passage in bumper cap 97 accommodates stem 95 on cap 91. Preferably, there is a close, tight fit between bumper cap 97 and cap 91. For reasons that will become apparent from the discussion that follows, bumper cap 97 is made of an elastomer or other polymeric material capable of absorbing shock, preferably without significant damage.

As discussed above, seats in swing valves, especially those used in fracturing systems where they are exposed to abrasive and often corrosive fluids flowing at high pressures and flow rates, are susceptible to erosion and have limited service lives. Thus, seats commonly are provided on a replaceable sleeve, and pressure-fitting the sleeve in the valve housing is a common way of mounting a replaceable sleeve. Necessarily, however, the sleeve must tightly engage the valve housing to ensure that it is securely mounted while the valve is in service. Moreover, the sleeve may tend to stick after a period of service. Thus, special tools usually are required to remove a pressure-fitted sleeve after it has become worn or to install a fresh sleeve.

Conventional valve seat sleeve removal tools typically are most easily employed when the valve is disassembled from a flow line. Many cannot be employed if the valve is assembled in a flow line. Necessarily, then, replacement of a valve seat sleeve may be time consuming and costly, especially if fracturing operations must be suspended to accommodate servicing of the valve. Sleeve engagement tool 90, however, may be used to extract a worn valve seat sleeve 67 and to install a new valve seat sleeve 67 in flapper valve 60—without disassembling valve 60 from flow line 33—by generating hydraulic pressure within flow line 33.

For example, as will be appreciated from FIG. 10, sleeve engagement tool 90 may be used to extract valve seat sleeve 67 from flapper valve 60 by first removing flapper assembly 70. More particularly, and using flapper valve 60 in zipper manifold 30 as an example, pressure in the system both upstream to pumps 10 and downstream to well head 19 is bled off. Bonnet 65 then can be removed to access flapper assembly 70 and loosen flapper 72 on axel 71. Axle bonnets 66 can be removed to allow axle 71 to be removed, after which the rest of flapper assembly 70 may be removed through service port 64. Once flapper assembly 70 has been removed, cap 91 may be threaded onto the projecting, inner end of valve seat sleeve 67 and bumper cap 97 placed over cap 91.

Pumps 10 then may be started to build up hydraulic pressure in flow line 33 behind cap 91. Pressure will be built gradually until valve seat sleeve 67 is displaced from the receptacle in inlet bore 62a. Pressure preferably is monitored. A significant loss of pressure will indicate that sleeve 67 has been displaced. Since considerable pressure may be required, perhaps from about 1,000 to 2,000 psi or more, and because it may be released suddenly, sleeve 67 may be propelled completely out of the receptacle into flapper chamber 63. Made as it is from shock-absorbing material, bumper cap 97 will avoid or minimize any damage to the interior of valve housing 61.

Sleeve engagement tool 90 may be used to install valve seat sleeve 67 by similar methods. Cap 91 is coupled to a fresh sleeve 67, and sleeve 67 is hand-fitted into the receptacle in inlet bore 62a. Because hydraulic pressure must be generated from the other side of cap 91, however, bonnet 65 and axle bonnets 66 must be reinstalled after sleeve 67 and cap 91 are in place. Pumps 10, unless additional flow lines are installed, cannot be used to generate pressure above cap 91. Typically, however, a separate pump will be on site during fracturing operations to pump frac plugs and other tools into the well. Valves in well head 19 may be shut to divert fluid from the pump-down pumps into flow line 33 and provide hydraulic pressure above cap 91.

Sleeve engagement tool 90 may be used to remove a worn sleeve 47 and install a fresh sleeve 47 in pivot valve 40 by similar methods. Because pivot valves 40 are assembled into flow lines 33 in their reverse-flow orientation, however, sleeve 47 will be removed in a manner similar to methods by which sleeve 67 may be installed in flapper valve 60. Sleeve 47 may be installed in pivot valve 40 in a manner similar to methods by which sleeve 67 may be removed from flapper valve 60.

It also will be appreciated that pumps 10 and pump-down pumps are conveniently used to generate the hydraulic pressure required to remove and install the novel valve seat sleeves. They necessarily or typically are present during fracturing operations. If desired, however, and especially if other valves in the system allow for isolating the swing valve, other and smaller hydraulic pumps may be used.

Figure 11:
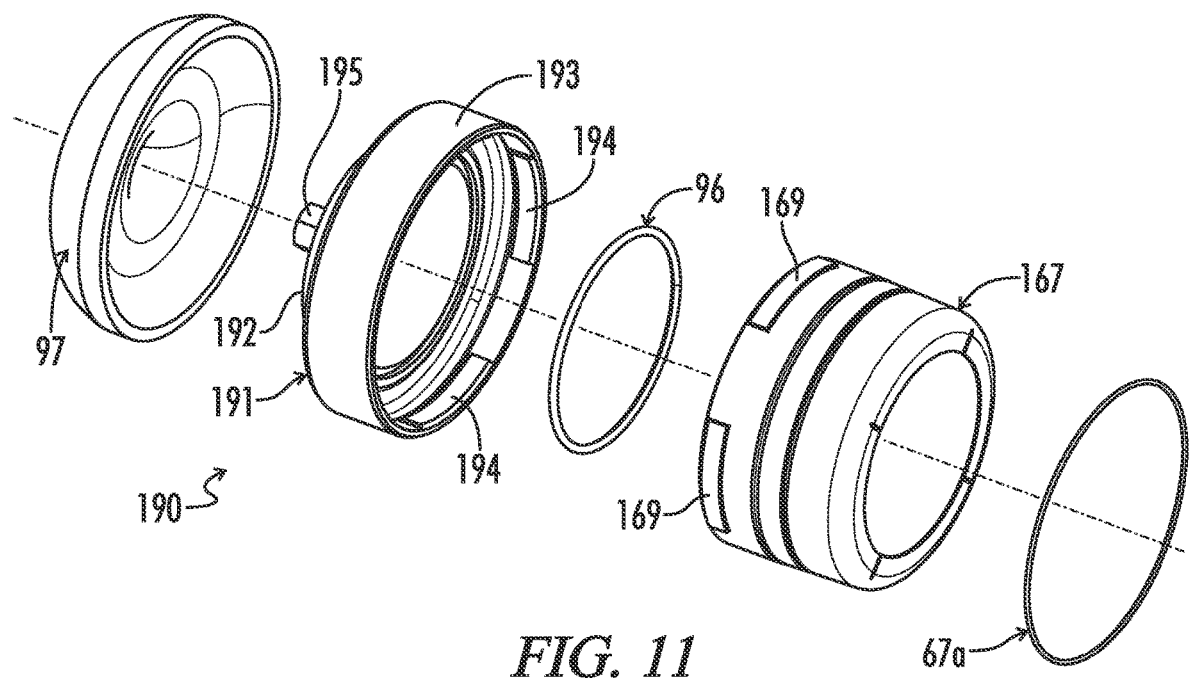
FIG. 11 is an exploded, isometric view of a second preferred embodiment 167 of the novel valve seat sleeves and a second preferred embodiment 190 of the novel valve seat sleeve engagement tools.
Figure 12:
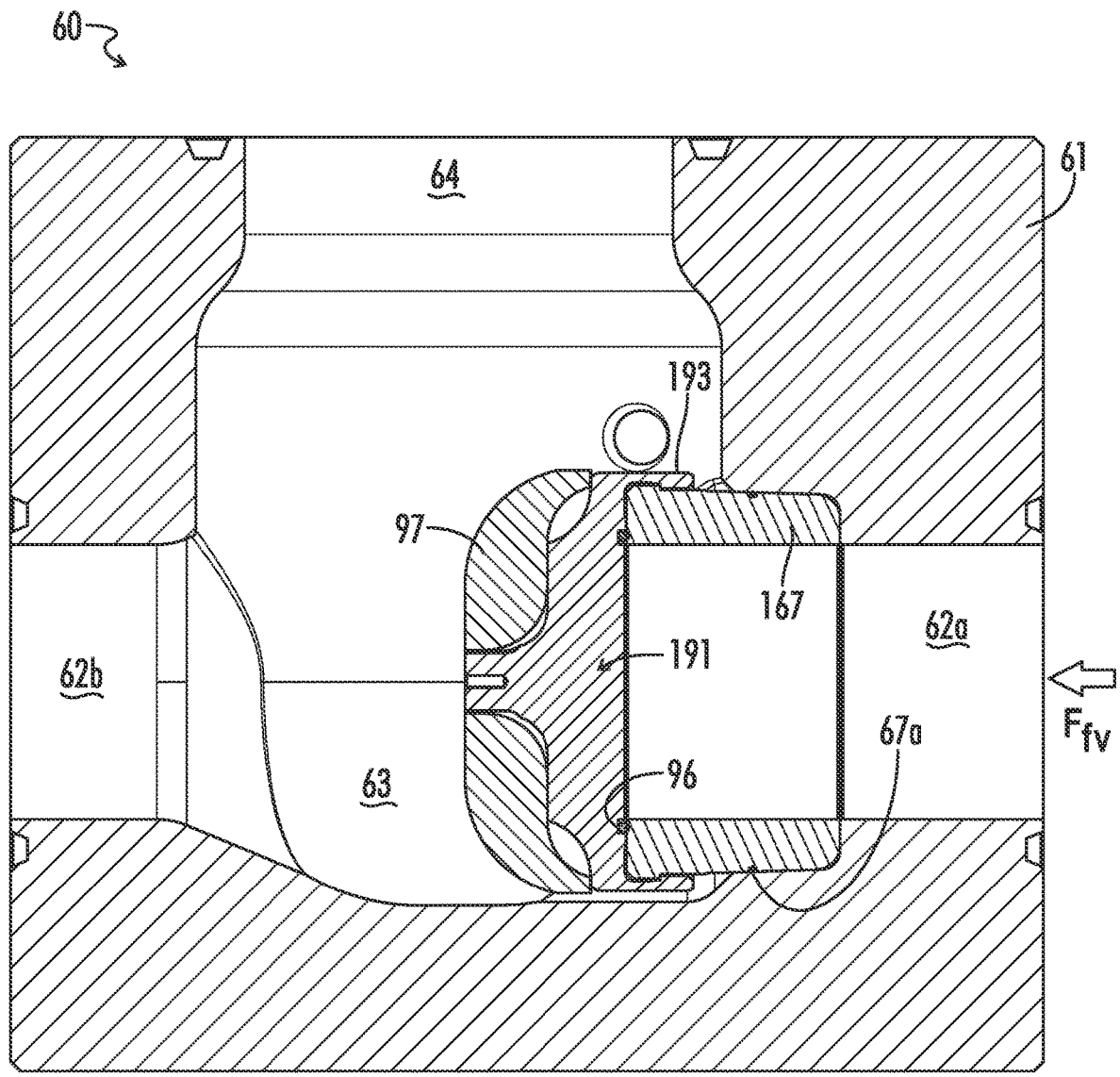
FIG. 12 is a cross-sectional view of flapper valve 60 with flapper assembly 70 having been removed and valve seat sleeve engagement tool 190 installed on novel seat 167.

A second preferred embodiment 190 of the novel valve seat sleeve engagement tools of the subject invention is shown in FIGS. 11-12. As seen therein, sleeve engagement tool 190 is similar in many respects to sleeve engagement tool 90. Sleeve engagement tool 190, however, may be used with a second preferred embodiment 167 of the novel valve seat sleeves of the invention instead of valve seat sleeve 67. It also comprises a lugged cap 191 instead of threaded cap 91.

Novel valve seat sleeve 167 is identical to valve seat sleeve 67 except that it is provided with external lugs 169 instead of external threads 69. More particularly, valve seat sleeve 167 comprises one or more lugs 169 arrayed around the outer circumference of its inner end. Lugs 169 extend arcuately around and radially outward from the inner end of sleeve 167. For example, valve seat sleeve 167 is provided with four lugs 169, each extending approximately 45° around the outer circumference and being separated by approximately 45°. Lugs 169 allow lugged cap 191 to be coupled to valve seat sleeve 167.

Lugged cap 191 is similar to threaded cap 91 except that it comprises one or more internal lugs 194 instead of internal threads 94. Lugs 194 extend radially inward from the lower end of a skirt 193 extending downwardly from a top 192 of cap 190. They are arrayed around the inner circumference of skirt 193. For example, four lugs 169, each extending approximately 45° and separated by approximately 45°, are provided on the inside of skirt 193. Cap 191 may be coupled to sleeve 167 by inserting lugs 169 on cap 191 through the spaces between lugs 169 on sleeve 167 and then rotating lugged cap 191. Stops, tapers, and the like as conventionally are provided in such interlocking lug couplings may be provided to limit rotation of cap 191 and to ensure that it securely engages sleeve 167.

As with sleeve engagement tool 90, sleeve engagement tool 190 also comprises a face seal 196 and a bumper cap 197. In any event, sleeve engagement tool 190 may be used to extract a worn valve seat sleeve 167 and to install a new valve seat sleeve 167 in pivot valve 40 or flapper valve 60 by using hydraulic fluid within the flow line by methods substantially identical to those used with sleeve engagement tool 90.

It will be appreciated that external threads or lugs on the novel valve seat sleeves and internal threads or lugs on the novel caps provide simple and effective mechanisms for coupling the caps to the sleeves. Other features may be provided, however, that enable coupling of the caps to the sleeves. For example, the sleeves and caps could be provided with external hubs that can be drawn together by a clamp to provide a sufficiently pressure-tight coupling between the cap and sleeve.

A third preferred embodiment 290 of the novel valve seat sleeve engagement tools is exemplified by FIGS. 13-16. Novel sleeve engagement tool 290 may be used, for example, to extract a worn valve seat sleeve 67 and to install a new valve seat sleeve 67 in flapper valve 60 assembled into a flow line 133 shown in FIG. 13. Flow line 133 may be incorporated into a zipper manifold or elsewhere in systems for fracturing wells, or in other high-pressure fluid transportation systems. As may be seen in FIG. 13, in addition to flapper valve 60, flow line 133 generally comprises spools 34, rotatable flange elbows 35, and tee fittings 138. Flow line 133 also comprises a radioactive densitometer 29 assembled to a spool 39 fabricated from high-yield steel. The densitometer assembly is disclosed in applicant's co-pending application Ser. No. 17/149,459 filed Jan. 14, 2021.

It will be appreciated that tee fittings 138 have three bores extending into the fitting housing. Two of the bores are aligned axially with each other and form what may be referred to as a main bore or passage 382. The third or side bore 383 extends off the main bore. Side bore 383 may be a straight-line bore extending perpendicularly to main bore 382 or, as illustrated, a long-sweep bore extending away from main bore 382. Tee fittings 138 preferably, as exemplified, are provided with flush ports 384. Flush ports 384 may be covered with a blind flange while flow line 133 is in service or provided with connection subs to facilitate flushing of the system.

Figure 13:
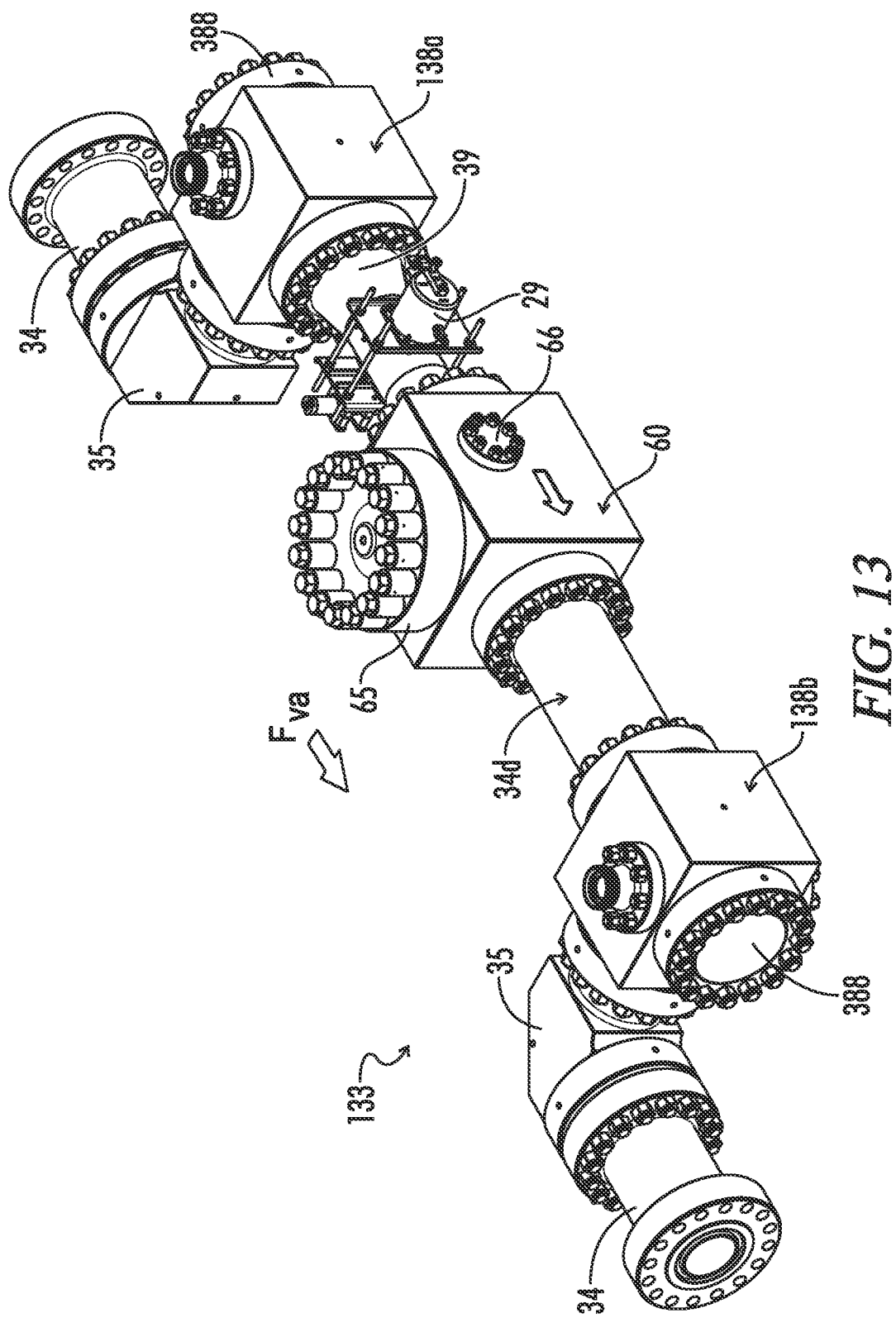
FIG. 13 is an isometric view of a flow line 133 that may be incorporated into a frac system, such as that shown in FIG. 1, which flow line 133 comprises flapper valve 60.

In any event, one end of main bore 382 of tee fitting 138b serves as an access port 387. When flow line 133 is in service, as shown in FIG. 13, a blind flange 388 is mounted over access port 387. It also will be appreciated that the central axis of the passageways through tee fitting 138a, spool 39, flapper valve 60, spool 34d, and tee fitting 138b are aligned. Moreover, flapper valve 60 and those other components are offset from the rest of flow line 133 into which flapper valve 60 is assembled. That is, the central axis of flapper valve 60 and access port 387 in tee fitting 138b are aligned, but also are offset from, or otherwise unaligned with the other components of flow line 133 by tee fittings 138 and elbows 35.

Figure 14:
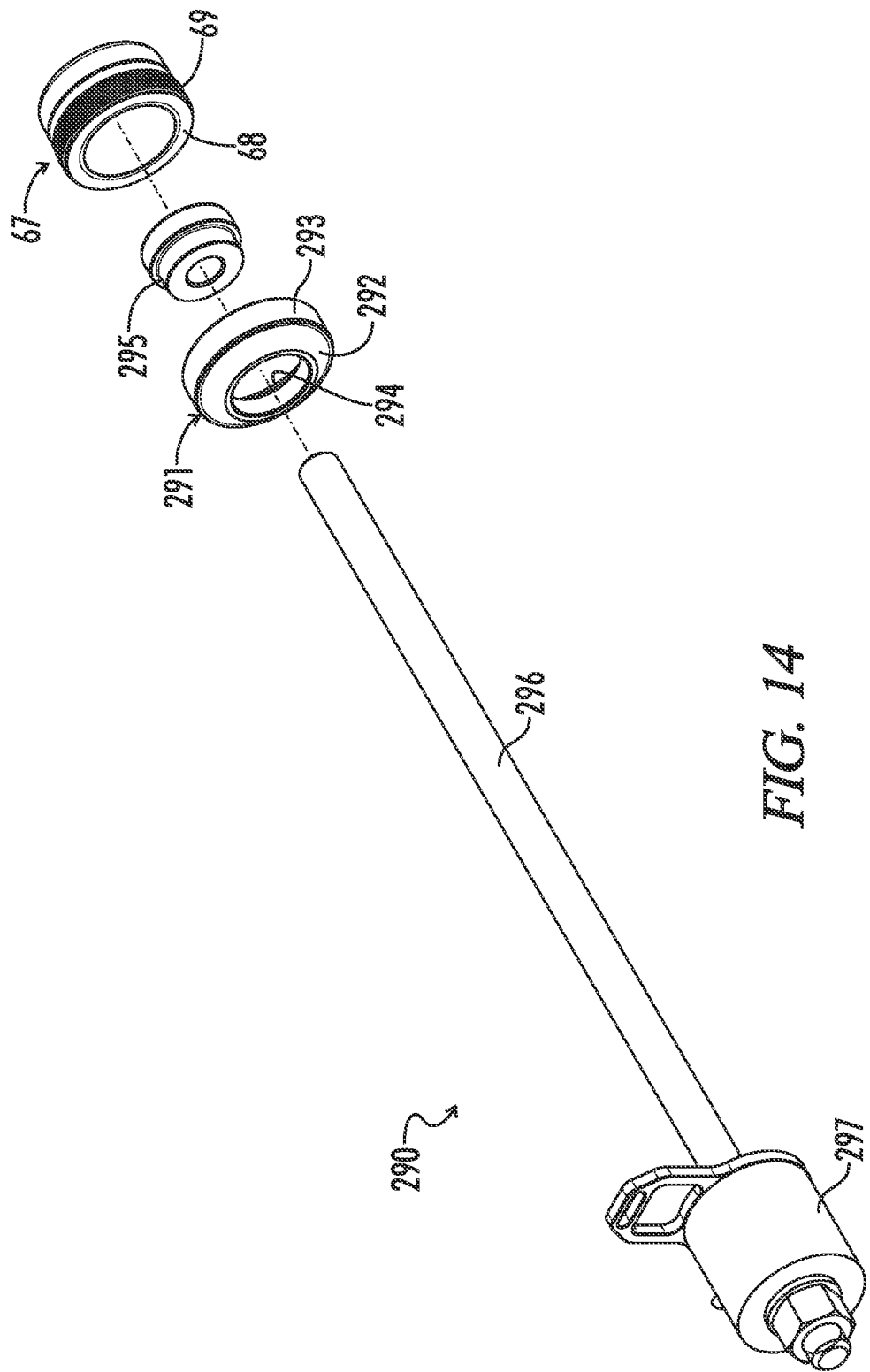
FIG. 14 is an exploded, isometric view of novel valve seat sleeve 67 and a third preferred embodiment 290 of the novel valve seat sleeve engagement tools.
Figure 15:
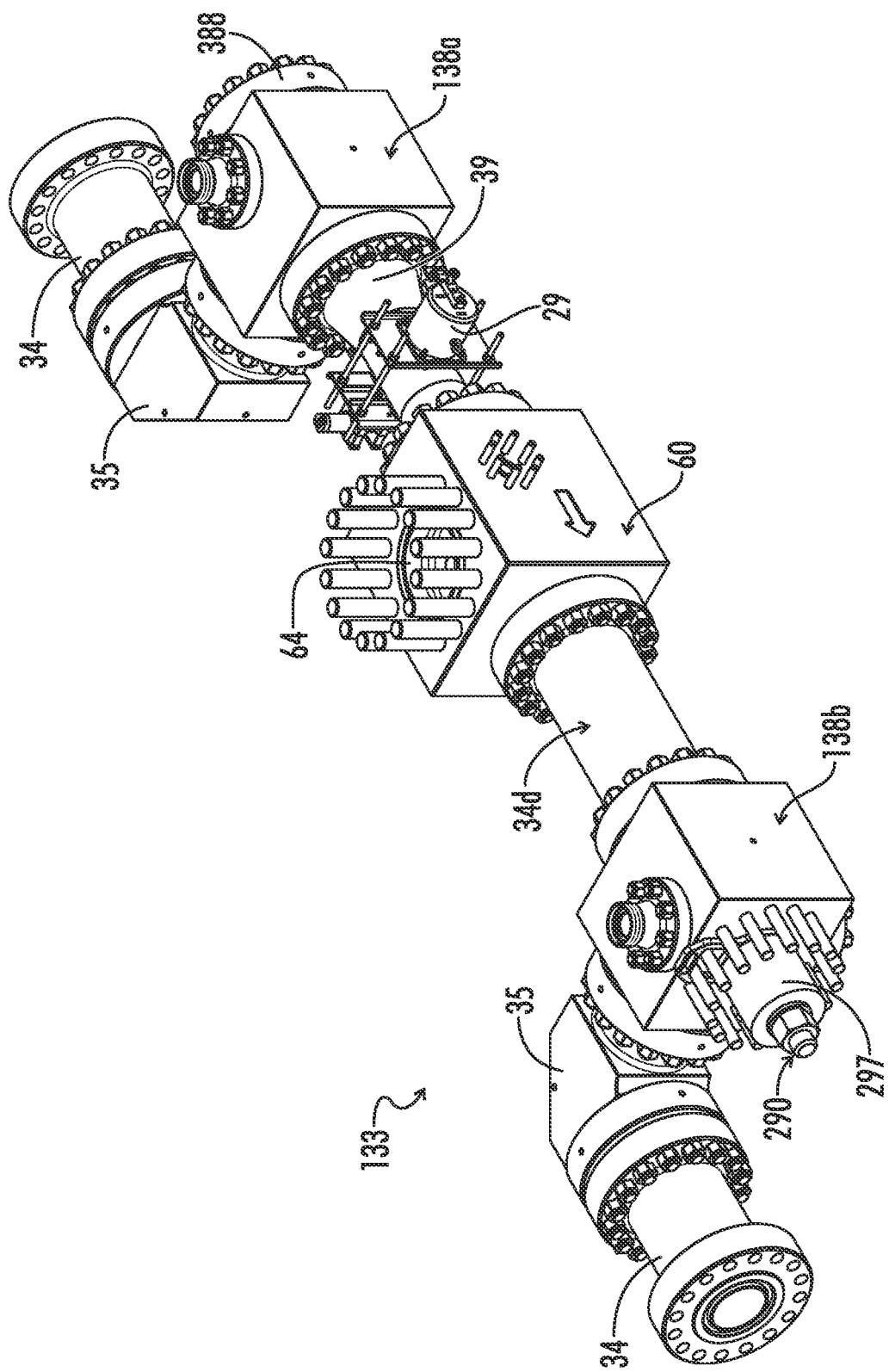
FIG. 15 is an isometric view of flow line 133 with flapper assembly 70 of flapper valve 60 having been removed and novel valve seat sleeve engagement tool 290 having been installed therein.
Figure 16:
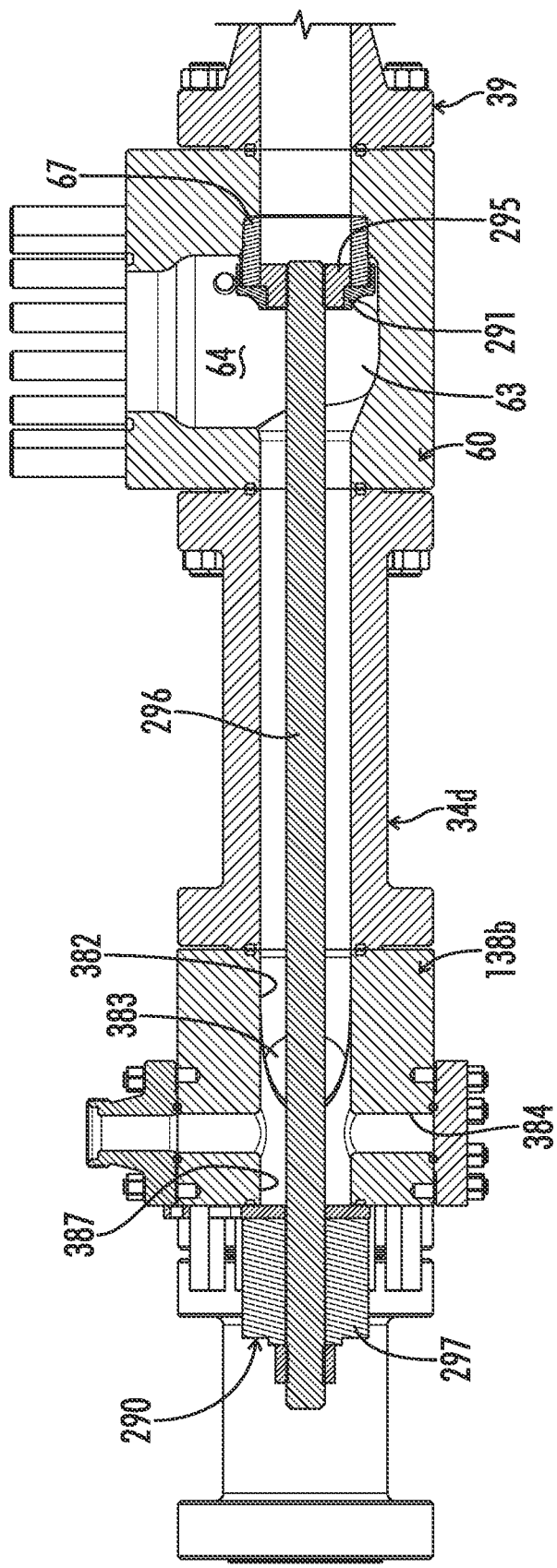
FIG. 16 is a cross-sectional view of a portion of flow line 133 shown in FIG. 15, which portion shows flapper valve 60 and novel seat engagement tool 290 having been installed therein.

As seen best in FIG. 14, sleeve engagement tool 290 generally comprises an internally threaded annular cap 291, an annular catch 295, a connecting rod 296, and a linear actuator 297. Annular cap 291 comprises a top 292 having a central opening. A relatively short annular skirt 293 extends downward from top 292. Annular skirt 193 is provided with internal threads 294 that can engage external threads 69 on valve seat sleeve 67. Annular cap 291 may be provided with features to assist in threading cap 291 on sleeve 67, such as bevels on skirt 193 that may be engaged by a wrench. Typically, however, hand-tightening will suffice. Likewise, as with cap 191 of sleeve engagement tool 190, annular cap 291 of sleeve engagement tool 290 may be provided with internal lugs when sleeve 167 is employed in flapper valve 60. Other features also may be provided that enable the cap to be coupled to the valve seat sleeve.

Annular catch 295 is connected to one end of connecting rod 296, for example, by a threaded connection. Annular catch 295 has a nominal diameter that allows it to be inserted into sleeve 67. A reduced diameter portion of annular catch 295 extends beyond sleeve 67 and through the opening in cap 291. The reduced diameter portion provides a shoulder that engages the bottom side of cap 291. The other end of connecting rod 296 is connected to a linear actuator, such as hydraulic linear actuator 297.

Sleeve engagement tool 290 may be used to extract a worn or install a new valve seat sleeve 67 in flapper valve 60 by actuating hydraulic actuator 297. For example, sleeve engagement tool 290 may be used to extract valve seat sleeve 67 from flapper valve 60 in flow line 133. As will be appreciated by comparing FIG. 13, which shows flow line 133 generally in an operational state, with FIGS. 15-16, which show flow line 133 with sleeve engagement tool 190 installed therein, pressure in flow line 133 is first bled off. Flapper assembly 70 then is removed from flapper valve 60 generally as described in respect to the use of sleeve engagement tool 90. Bonnet 65 is removed to access flapper assembly 70 and disengage flapper 72 from axel 71. Axle bonnets 66 then are removed to allow axle 71 to be extracted, after which the rest of flapper assembly 70 may be extracted through service port 60.

Once flapper assembly 70 has been removed, blind flange 388 of tee fitting 138*b* may be removed and seat removal tool 290 installed. More specifically, connecting rod 296 with hydraulic actuator 297 attached at one end thereof is inserted through main bore 382 of tee fitting 138*b* and spool 34*d* into flapper chamber 63 of valve 60. It will be appreciated that insertion of connecting rod 296 is possible because, as noted above, the portion of flow line 133 in which flapper valve 60 is assembled is offset from the other portions of flow line 133. The passages through tee fitting 138*b*, spool 34*d*, and valve 60 are aligned along their central, primary axes, or at least sufficiently aligned to allow connection rod 296 to extend from the exterior of tee fitting 138*b* into flapper chamber 63 of flapper valve 60.

Working through service port 64, annular cap 291 then is slid over the other end of connecting rod 296, after which annular catch 295 is threaded on the same end. Annular catch then is inserted into sleeve 67. Hydraulic actuator 297 then may be mounted to the body of tee fitting 138*b* and annular cap 291 threaded on the projecting, inner end of sleeve 67. Once completely mounted, hydraulic actuator 297 may be actuated to pull seat 67 out of the receptacle in inlet bore 62*a*. Other linear actuators, however, may be used if desired instead of hydraulic actuator 297. Pneumatic linear actuators may be used. Mechanical linear actuators, such as powered or hand-operated screw-driven linear actuators, also may be used if desired.

Sleeve engagement tool 290 may be used to install valve seat sleeve 67 in flapper valve 60 in a similar manner. Engagement tool 290, however, will be mounted to and extend through upstream components of flow line 133. More specifically, sleeve 67 first will be fitted loosely within the receptacle in inlet bore 62*a*. Connecting rod 296 then will be inserted through tee fitting 138*a*, spool 39, sleeve 67, and into flapper chamber 63. Annular cap 91 may be slid over the end of connecting rod 296 and threaded on seat 67. Annular catch 295 then is threaded on the end of connecting rod 296 such that the shoulder on annular catch 295 bears against the top of annular cap 291. Hydraulic actuator 297 then may be actuated to pull seat 67 into the receptacle in inlet bore 62*a*.

It thus will be appreciated that by providing an access port that is offset from, or otherwise unaligned with the passage in the swing valve, sleeve engagement tool 290 may be deployed to remove or install a valve seat sleeve without disassembling valve 60 from flow line 133. It also will be appreciated that other conventional tee fittings may be used if desired to provide an access bore. Similarly, other fittings, such as lateral and cross fittings, may be assembled into the flow line such that one of their bores provides an access bore leading into an insertion path that is substantially aligned with the valve seat sleeve while providing the desired misalignment that will allow deployment of the sleeve engagement tool.

The flowline components of the subject invention may be manufactured by methods and from materials commonly used in manufacturing flow iron components. Given the extreme stress and the corrosive and abrasive fluids to which flowline components are exposed, especially those designed for high-pressure, high-velocity flow lines, suitable materials will be hard and strong. For example, the novel components, except for their seals, may be manufactured from 4130 and 4140 chromoly steel or from somewhat harder, stronger steel such as 4130M7, high end nickel alloys, and stainless steel. The components may be made by any number of conventional techniques, but typically and in large part will be made by forging, extruding, or mold casting a blank part and then machining the required features into the part. Conventional components of the novel flow lines are widely available from a number of manufacturers.

The novel components also will incorporate various features of conventional high-pressure flowline components. For example, the novel valves and fittings are quite heavy and, therefore, preferably incorporate components which make it easier to handle and manipulate the valve, such as lifting eyes. Other conventional features, however, may be incorporated into the novel components as will be readily appreciated by workers in the art having the benefit of this disclosure.

Similarly, the novel components have been described in the context of frac systems. While frac systems in particular and the oil and gas industry in general rely on valves and fittings, especially in high-pressure applications, the novel components are not limited to such applications or industries. Likewise, they are not limited in their application to the specific, exemplified flow lines, zipper manifold, or frac systems, or to the mentioned pressure ratings. Suffice it to say that the novel components have wide applicability wherever flapper valves and fittings have been conventionally applied.

It also will be appreciated that the terms such as "upper," "lower," "inner," "outer," "horizontal," "vertical," and the like are made with reference to the orientation in which the novel flapper valves generally will be when they are assembled into a flowline, for example, as illustrated in FIGS. 2-3. The novel flapper valves necessarily will be installed with the central passage running substantially horizontally if the flapper is to operate as intended.

While this invention has been disclosed and discussed primarily in terms of specific embodiments thereof, it is not intended to be limited thereto. Other modifications and embodiments will be apparent to the worker in the art.

What is claimed is:

1. A system for fracturing a well, said system comprising:
   (a) a flow line adapted to convey frac fluid discharged from one or more high-pressure pumps to a well head; and
   (b) a swing valve mounted in said flow line and adapted to control flow through said flow line, said swing valve comprising:
   i) a valve housing adapted for assembly into said flow line;
   ii) a passage in said housing providing a valve inlet, a valve outlet, and a closure chamber;
   iii) a swing closure, said closure being mounted for pivoting movement through said, closure chamber;
   iv) a sleeve pressure fitted into a receptacle in said passage, said sleeve comprising:
      (1) a first end pressure fitted into said receptacle;
      (2) a second end projecting out of said receptacle into said closure chamber; and
      (3) a valve seat on a face of said second sleeve end;
      (4) wherein said second sleeve end comprises external threads adapted to engage internal threads on a sleeve cap extending over and across said second sleeve end to shut off flow through said sleeve.

2. The system of claim 1, wherein said housing comprises a service port and a bonnet removably covering said service port, said service port providing access to said closure chamber.

3. The system of claim 1, wherein said housing has a union face at said inlet adapted for connection to a flowline component by a flange union and a union face at said outlet adapted for connection to a flowline component by a flange union.

4. The system of claim 1, wherein said swing valve is a flapper valve.

5. The system of claim 1, wherein said swing valve is a pivot valve.

6. A swing valve, said swing valve comprising:
   (a) a passage having a receptacle; and
   (b) a sleeve pressure fitted into said receptacle, said sleeve adapted to conduct flow through said valve and comprising:
   i) a first end pressure fitted into said receptacle;
   ii) a second end projecting out of said receptacle; and
   iii) a valve seat on a face of said second sleeve end;
   iv) wherein said second sleeve end comprises external threads adapted to engage internal threads on a sleeve cap extending over and across said second sleeve end to shut off flow through said sleeve.

7. The swing valve of claim 6, wherein said swing valve is a flapper valve.

8. The swing valve of claim 6, wherein said swing valve is a pivot valve.

9. A high-pressure fluid transportation system, said system comprising a swing valve of claim 6.

10. A method of assembling a system for fracturing a well, said method comprising:
   (a) providing a flow line to convey frac fluid discharged from one or more high-pressure pumps to a well head; and
   (b) assembling the swing valve of claim 6 into said flow line.

11. An assembly for removing a valve seat sleeve from a swing valve:
   (a) wherein said swing valve is assembled into a flow line adapted to convey frac fluid discharged from one or more high-pressure pumps to a well head;
   (b) wherein a first end of said valve seat sleeve is pressure fitted in a passage of said swing valve; and
   (c) wherein said assembly comprises a cap coupled over a second end of said valve seat sleeve;
   (d) whereby said valve seat sleeve may be dislodged from said passage by generating hydraulic pressure in said valve seat sleeve behind said cap.

12. The assembly of claim 11, wherein said second end of said sleeve comprises external threads adapted to engage internal threads on said cap.

13. The assembly of claim 11, wherein said second end of said sleeve comprises external lugs adapted to engage internal lugs on said cap.

14. The assembly of claim 11, wherein said assembly comprises a face seal between said cap and a seat on said valve seat sleeve.

15. The assembly of claim 11, wherein said swing valve is a flapper valve.

16. The assembly of claim 11, wherein said swing valve is a pivot valve.

17. A method of removing a valve seat sleeve from a swing valve mounted in a flow line adapted to convey frac fluid discharged from one or more high-pressure pumps to a well head, wherein one end of said valve seat sleeve is pressure fitted in said swing valve, said method comprising:
   (a) extracting a swing closure assembly of said swing valve;
   (b) coupling a cap over a second end of said valve seat sleeve;
   (c) pumping fluid from at least one of said one or more high-pressure pumps through said flow line toward said swing valve; and
   (d) building hydraulic pressure within said flow line to a level sufficient to dislodge said valve seat sleeve from said swing valve.

18. The method of claim 17, wherein said swing closure assembly is extracted by:
   (a) removing a bonnet from a service port in said swing valve; and
   (b) extracting one or more components of said swing closure assembly through said service port.

19. The method of claim 17, wherein said swing closure assembly is extracted by:
   (a) removing a bonnet from a service port in said swing valve;
   (b) removing a bonnet from an axle port in said swing valve; and
   (c) extracting said swing closure assembly through said service port and said axle port.

20. The method of claim 17, wherein said cap is coupled to said valve seat sleeve by engaging internal threads on said cap with external threads on said second end of said valve seat sleeve.

21. The method of claim 17, wherein said cap is coupled to said valve seat sleeve by engaging internal lugs on said cap with external lugs on said second end of said valve seat sleeve.

22. The method of claim 17, wherein said swing valve is a flapper valve.

23. The method of claim 17, wherein said swing valve is a pivot valve.

24. A method of removing a valve seat sleeve pressure fitted into a receptacle in a swing valve, said method comprising:
(a) coupling a cap on said valve seat sleeve; and
(b) providing hydraulic pressure in said valve seat sleeve sufficient to dislodge said valve seat sleeve from said receptacle.

25. The method of claim 24, wherein said cap is coupled to said valve seat sleeve by engaging internal threads on said sleeve cap with, external threads on said valve seat sleeve.

26. The method of claim 24, wherein said cap is coupled to said valve seat sleeve by engaging internal lugs on said sleeve cap with external lugs on said valve seat sleeve.

27. The method of claim 24, wherein said swing valve is a flapper valve.

28. The method of claim 24, wherein said swing valve is a pivot valve.

29. A system for fracturing a well, said system comprising:
(a) a flow line adapted to convey frac fluid discharged from one or more high-pressure pumps to a well head; and
(b) a swing valve mounted in said flow line and adapted to control flow through said flow line, said swing valve comprising:
  i) a valve housing adapted for assembly into said flow line;
  ii) a passage in said housing providing a valve inlet, a valve outlet, and a closure chamber;
  iii) a swing closure, said closure being mounted for pivoting movement through said, closure chamber;
  iv) a sleeve pressure fitted into a receptacle in said passage, said sleeve comprising:
    (1) a first end pressure fitted into said receptacle;
    (2) a second end projecting out of said receptacle into said closure chamber; and
    (3) a valve seat on a face of said second sleeve end;
    (4) wherein said second sleeve end comprises external lugs adapted to engage internal lugs on a sleeve cap extending over and across said second sleeve end to shut off flow through said sleeve.

30. The system of claim 29, wherein said housing comprises a service port and a bonnet removably covering said service port, said service port providing access to said closure chamber.

31. The system of claim 29, wherein said housing has a union face at said inlet, adapted for connection to a flowline component by a flange union and a union face at said outlet adapted for connection to a flowline component by a flange union.

32. The system of claim 29, wherein said swing valve is a flapper valve.

33. The system of claim 29, wherein said swing valve is a pivot valve.

34. A swing valve, said swing valve comprising:
(a) a passage having a receptacle; and
(b) a sleeve pressure fitted into said receptacle, said sleeve adapted to conduct flow through said valve and comprising:
  i) a first end pressure fitted into said receptacle;
  ii) a second end projecting out of said receptacle; and
  iii) a valve seat on a face of said second sleeve end;
  iv) wherein said second sleeve end comprises external lugs adapted to engage internal lugs on a sleeve cap extending over and across said second sleeve end to shut off flow through said sleeve.

35. The swing valve of claim 34, wherein said swing valve is a flapper valve.

36. The swing valve of claim 34, wherein said swing valve is a pivot valve.

37. A high-pressure fluid transportation system, said system comprising a swing valve of claim 34.

* * * * *